United States Patent
Henschel et al.

(10) Patent No.: US 6,909,833 B2
(45) Date of Patent: Jun. 21, 2005

(54) OPTICAL FIBER ENCLOSURE SYSTEM USING INTEGRATED OPTICAL CONNECTOR AND COUPLER ASSEMBLY

(75) Inventors: James J. Henschel, Bellingham, MA (US); Ronald Cooper, Shrewsbury, MA (US); Michael Noonan, Shrewsbury, MA (US)

(73) Assignee: Fiber Optic Network Solutions, Inc., Marlborough, MA (US)

( * ) Notice: Subject to any disclaimer, the term of this patent is extended or adjusted under 35 U.S.C. 154(b) by 0 days.

(21) Appl. No.: 10/099,862

(22) Filed: Mar. 15, 2002

(65) Prior Publication Data

US 2003/0174996 A1 Sep. 18, 2003

(51) Int. Cl.[7] .............................. G02B 6/00; G02B 6/38
(52) U.S. Cl. ...................... 385/135; 385/137; 385/69
(58) Field of Search ................ 385/134–140, 385/42–49

(56) References Cited

U.S. PATENT DOCUMENTS

| | | | |
|---|---|---|---|
| 4,765,702 A | 8/1988 | Dohan et al. | 385/129 |
| 4,933,262 A | 6/1990 | Beguin | 430/320 |
| 5,258,616 A | 11/1993 | Gutcheck et al. | 250/227.21 |
| 5,285,512 A * | 2/1994 | Duncan et al. | 385/94 |
| 5,513,290 A | 4/1996 | Ishikawa et al. | 385/49 |
| 5,596,663 A | 1/1997 | Ishibashi et al. | 385/92 |
| 5,652,814 A * | 7/1997 | Pan et al. | 385/24 |
| 5,712,937 A * | 1/1998 | Asawa et al. | 385/49 |
| 5,778,130 A * | 7/1998 | Walters et al. | 385/134 |
| 5,917,975 A * | 6/1999 | Bloom | 385/78 |
| 6,201,908 B1 | 3/2001 | Grann | 385/24 |
| 6,208,796 B1 * | 3/2001 | Williams Vigliaturo | 385/135 |
| 6,233,376 B1 | 5/2001 | Updegrove | 385/14 |
| 6,243,526 B1 | 6/2001 | Garibay et al. | 385/135 |
| 6,250,818 B1 | 6/2001 | Loughlin et al. | 385/86 |
| 6,273,618 B1 | 8/2001 | Cheng | 385/56 |
| 6,280,100 B1 | 8/2001 | Haake | 385/73 |
| 6,296,400 B1 | 10/2001 | Uchiyama et al. | 385/94 |
| 6,318,909 B1 | 11/2001 | Giboney et al. | 385/90 |
| 6,477,309 B2 * | 11/2002 | So | 385/137 |
| 6,519,392 B2 * | 2/2003 | Im et al. | 385/48 |
| 6,546,168 B1 * | 4/2003 | Xie et al. | 385/39 |
| 6,554,487 B2 * | 4/2003 | Nolan | 385/78 |
| 6,576,165 B2 * | 6/2003 | Aloisio et al. | 264/1.25 |
| 6,644,866 B1 * | 11/2003 | Kusuda et al. | 385/88 |
| 2002/0150372 A1 * | 10/2002 | Schray | 385/135 |

FOREIGN PATENT DOCUMENTS

| | | |
|---|---|---|
| GB | 2288939 | 11/1995 |
| JP | 2000-66060 | 3/2000 |
| JP | 2001-33665 | 2/2001 |
| JP | 2001-43934 | 2/2001 |
| JP | 2001-83358 | 3/2001 |
| JP | 2001-264579 | 9/2001 |
| WO | WO 00/49433 | 8/2000 |
| WO | WO 00/55665 | 9/2000 |
| WO | WO 01/42839 | 6/2001 |
| WO | WO 01/61392 | 8/2001 |

\* cited by examiner

Primary Examiner—Chandrika Prasad
(74) Attorney, Agent, or Firm—Bowditch & Dewey, LLP

(57) ABSTRACT

An optical fiber enclosure system includes a plurality of integrated optical connector and coupler assemblies. The first optic coupler is integrated adjacent to the ferrule in the connector. In a preferred embodiment, the integrated optical connector coupler is constructed in a compact package such that when installed in the optical fiber enclosure no part of the coupler connector assembly protrudes beyond the footprint of the fiber enclosure and yet maintains an industry recommended minimum bend radius of 1.5 inches on the output cable ports thus allowing the fiber enclosure front panel to close without impinging on the cables of the assembly.

31 Claims, 33 Drawing Sheets

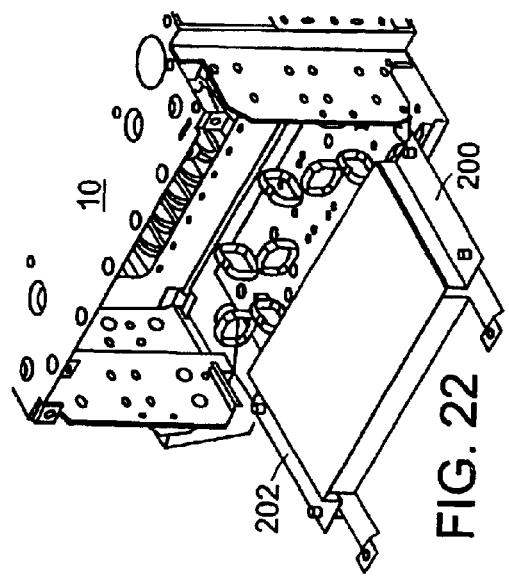
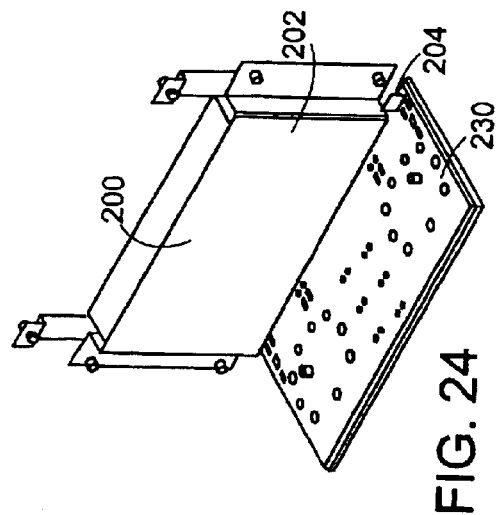
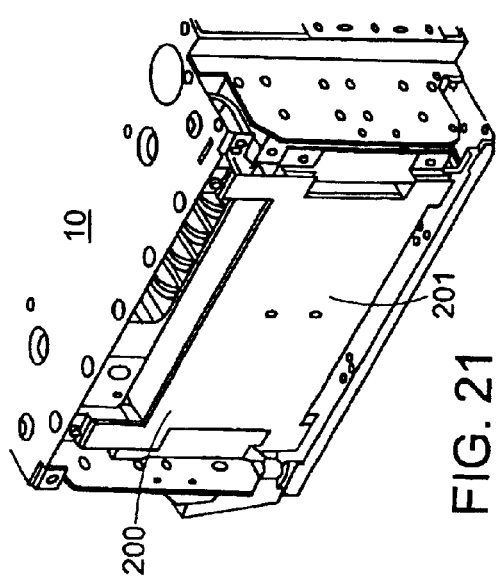
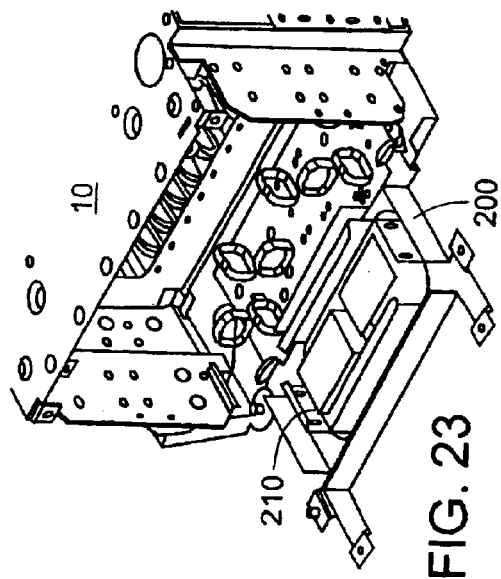

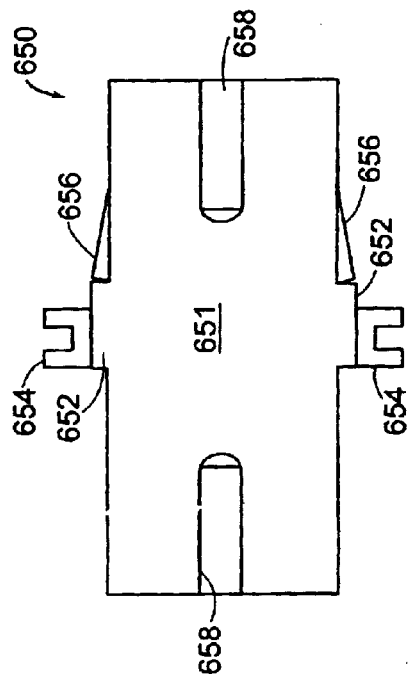
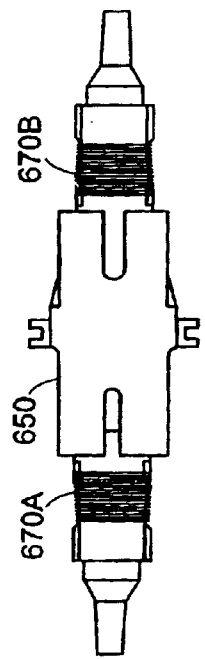
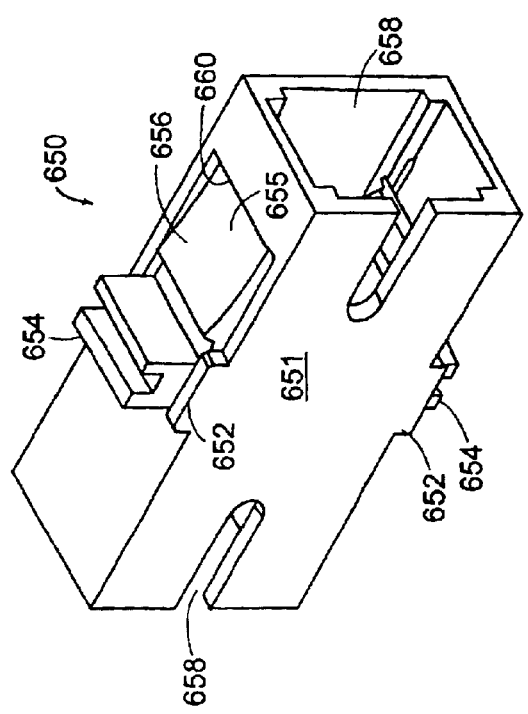
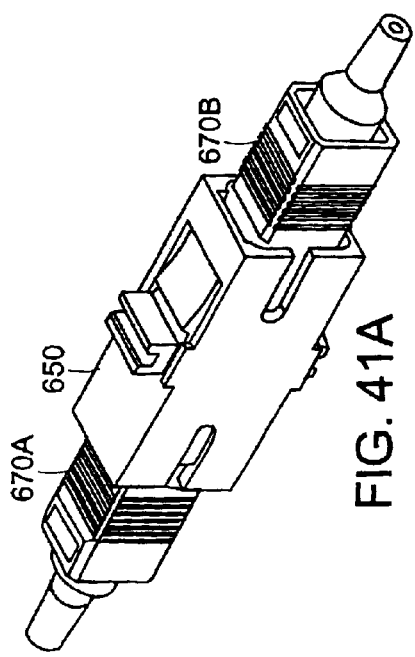
FIG. 40B
FIG. 41B
FIG. 40A
FIG. 41A

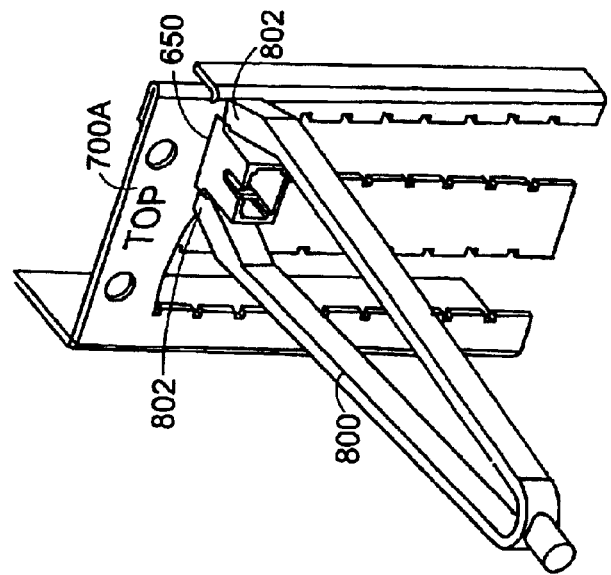
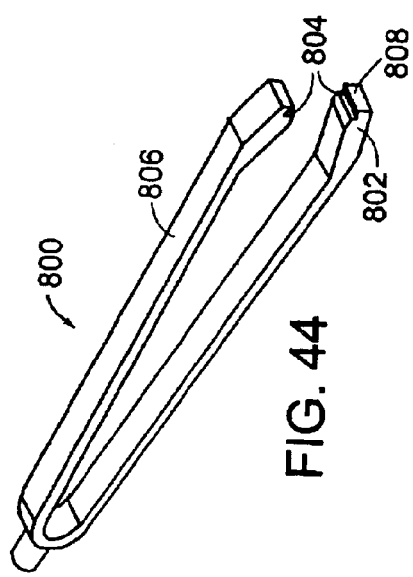
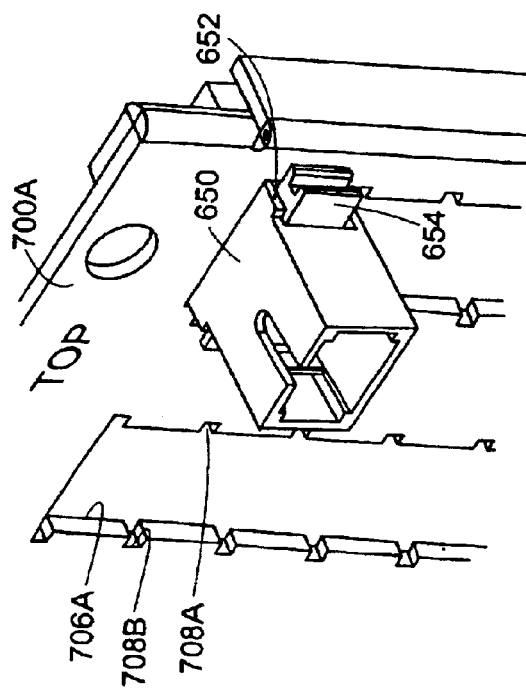

OPTICAL FIBER ENCLOSURE SYSTEM USING INTEGRATED OPTICAL CONNECTOR AND COUPLER ASSEMBLY

BACKGROUND OF THE INVENTION

With the growth of fiber optic communication systems, numerous devices have been developed to house and manage the complex assemblies needed.

One such system is known as an optical fiber cross-connect enclosure. Standard enclosures include a sheet metal housing with removable hinged front and rear doors. For fiber optic patching applications, a removable hinged bulkhead divides the housing into a front and rear compartment with the rear compartment typically being deeper than the front. Removable panels, which contain various numbers of fiber optic adapters, are mounted to the bulkhead. In a typical application, fiber optic jumpers are routed to the front and rear compartments for patching. Front access to the front compartment is provided through ports at the bottom of both sides with routing rings positioned along a front management plate mounted to the bottom of the housing. Bend radius guides are usually mounted to the housing to prevent sharp bends in the fiber as it enters the enclosure. Rear access to the rear compartment is provided through ports at the bottom of both sides with routing rings positioned along a rear management plate mounted to the bottom of the housing. Accommodations for ribbon fanout blocks are also common when the ribbon needs to be individually connectorized. For splicing applications, similar housings without the bulkhead are used. Various types of splice holders and management methods are used by different manufactures.

There remains a continuing need for improvements to lower cost, increase efficiency, capacity and density and provide for ease of maintenance with optical fiber enclosures.

Optical material such as in computer chips is being used to process data and in the form of optical fiber to transmit the data and information. The use of optical fiber to transmit data requires the use of optical couplers to connect various components. Some of the difficulties associated with optical fibers include concerns related to the bend radius of the fiber cable and coupling.

Coupling is the merging or splitting of two data transmitters, such as merging fibers into one fiber. In typical applications, an optical coupler that accepts two optical cable connectors and merges the information is housed in an optical coupler cassette and mounted in a fiber patch panel on a fiber distribution frame. This optical coupler cassette requires protective packaging and consumes valuable space in the fiber distribution frame.

An alternative method of coupling is by incorporating the coupler into a jumper, an optical fiber cable that extends between two units. By use of a jumper with a coupler, the space on the frame of the optical coupler cassette can be conserved. Some solutions may incorporate the coupler into the mid-span of the jumper but these solutions are undesirable from an administrative perspective since the coupler may be hidden or buried under a plurality of jumpers.

SUMMARY OF THE INVENTION

The present invention relates to improvements in fiber enclosure systems providing more efficient optical fiber management and maintenance. A fiber enclosure having a plurality of optical fiber cassettes and a splice module provides improved access and control of optical fiber management. The fiber enclosure provides increased patch and splice capacity and density.

The optical fiber cassette includes adapters, fiber optic connectors, front face, side wall, rear face, fanout devices and ribbon pigtails. The adapters are mounted to the front face of the cassette. The side wall is attached between the front face and the rear face to provide space for optical fiber management. The fanout devices are mounted to the rear face of the cassette and provide fanout of the ribbon pigtails to individual optical fibers that terminate at the fiber optic connectors. The fiber optic connectors are coupled to the adapters at the front face of the cassette.

The splice module includes a management plate and a hingedly joined splice door. The splice door can include a removable splice tray for mounting optical fiber splices and for managing associated slack fiber loops around the splices.

According to another aspect, a fiber radius guide adapted for reversible mounting to a fiber enclosure uses snap-on engagement.

A removable fiber optic adapter includes a body and at least one engagement member.

In another preferred embodiment, a compact integrated optical connector and coupler assembly includes a fiber optic coupler integrated in the body of a fiber optic connector immediately adjacent to the ferrule used in the connector. The preferred embodiment of the present invention provides a practical means of installing a fiber optic coupler in line with the jumper so that separate rack space is not required to house the coupler in a standard patch panel. Furthermore the placement of the coupler is such that the incremental length of the connector body and boot is minimized. This compact size allows the coupler-connector assembly to be positioned inside a standard patch panel without protruding beyond the confines of the cabinet. In a preferred embodiment, the integrated optical connector coupler is constructed in a compact package such that when installed in the optical fiber enclosure no part of the coupler connector assembly protrudes beyond the footprint of the fiber enclosure and yet maintains an industry recommended minimum bend radius of 1.5 inches on the output cable ports thus allowing the fiber enclosure front panel to close without impinging on the cables of the assembly.

In one embodiment, the compact optical coupler jumper can be used with no additional frame space and since the coupler and connector are immediately juxtaposed, the coupler is easy to locate making for efficient administration. A principal advantage of the invention is that the overall length of the assembly is compact enough to allow the coupler-connector assembly to be installed in standard patch panels, and form sufficient transition bend, so that the jumper assembly does not interfere with the door on the patch panel.

Preferred embodiments of the present invention are used as optical monitoring devices in an optical network system, as a wavelength division multiplexing assembly, an optical tap and as an optical power splitter. In a preferred embodiment, the integrated connector and coupler assembly is included in an optical transport network system for network monitoring. The optical transport network may include, voice, video and data systems using optical signals. The preferred embodiment includes an optical tap coupler integrated into a fiber optic connector, preferably adjacent the ferrule in the connector. The preferred embodiment may be used in a network topology such as, but not limited to, a gigabit Ethernet system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 21 is a rear perspective view of the enclosure of FIG. 1 with a fold down splice module in the closed position.

FIG. 22 is a rear perspective view of the enclosure of FIG. 1 with the fold down splice module in the opened position.

FIG. 23 is a rear perspective view of the enclosure of FIG. 1 with the fold down splice module in the opened position and cover removed.

FIG. 24 is a front perspective view of the fold down splice module in the closed position.

FIGS. 40A and 40B illustrate a second embodiment of a removable adapter.

FIGS. 41A and 41B illustrate perspective and plan views, respectively, of the removable adapter of FIGS. 40A, 40B having pigtail connectors engaged with the adapter.

FIG. 42 illustrates a perspective view of the adapter of FIGS. 40A, 40B mounted to an adapter panel.

FIG. 43 illustrates extraction of the adapter from the panel using an extraction tool in accordance with a preferred embodiment of the present invention.

FIG. 44 illustrates the extraction tool in accordance with a preferred embodiment of the present invention.

DETAILED DESCRIPTION OF THE INVENTION

The present system provides a fiber optic cross-connect enclosure which can accommodate a variety of quantities of fiber optic cross-connect patches and splices. The present system builds on the known standard enclosures by increasing patch and splice capacity and incorporating other improvements.

Figure 1:
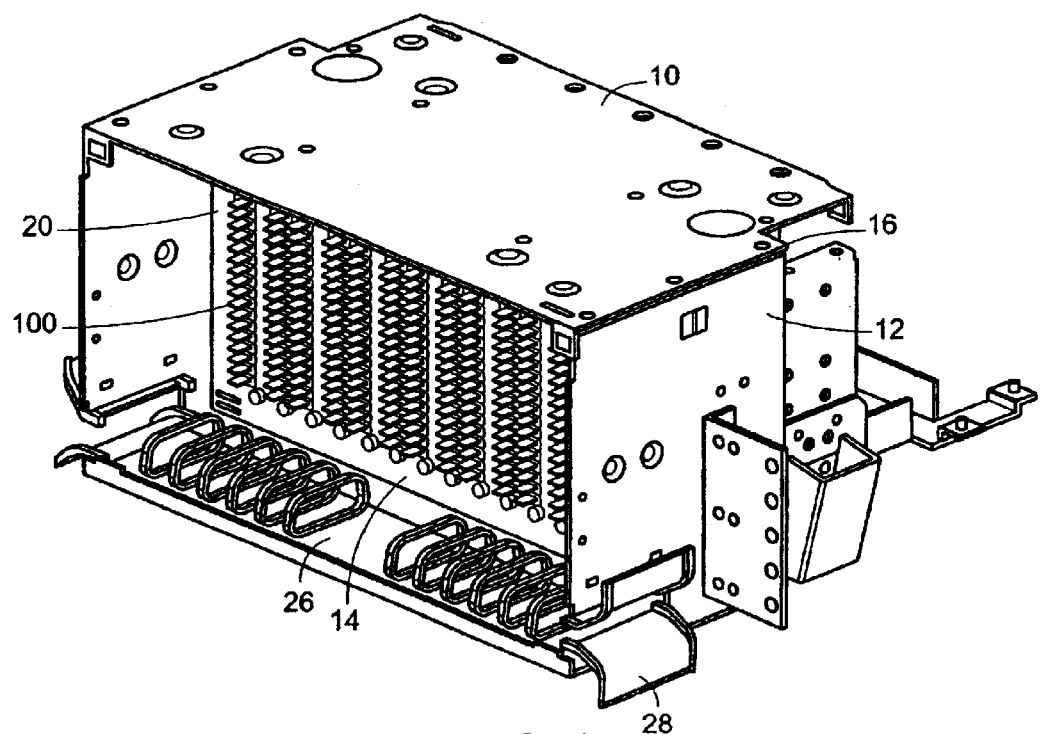
FIG. 1 is a front perspective view of an embodiment of an optical fiber enclosure.
Figure 2:
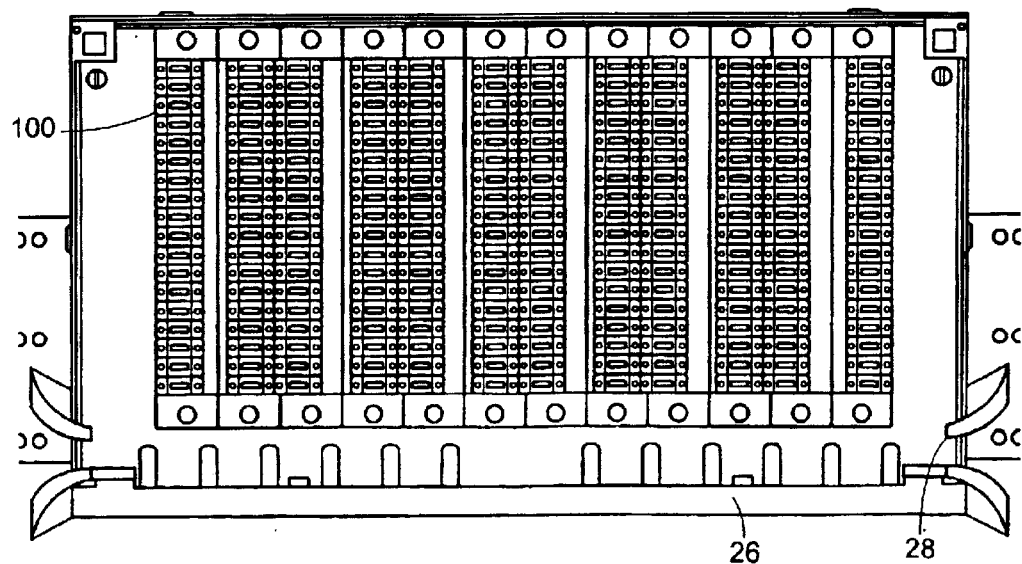
FIG. 2 is a front view of the enclosure of FIG. 1.
Figure 3:
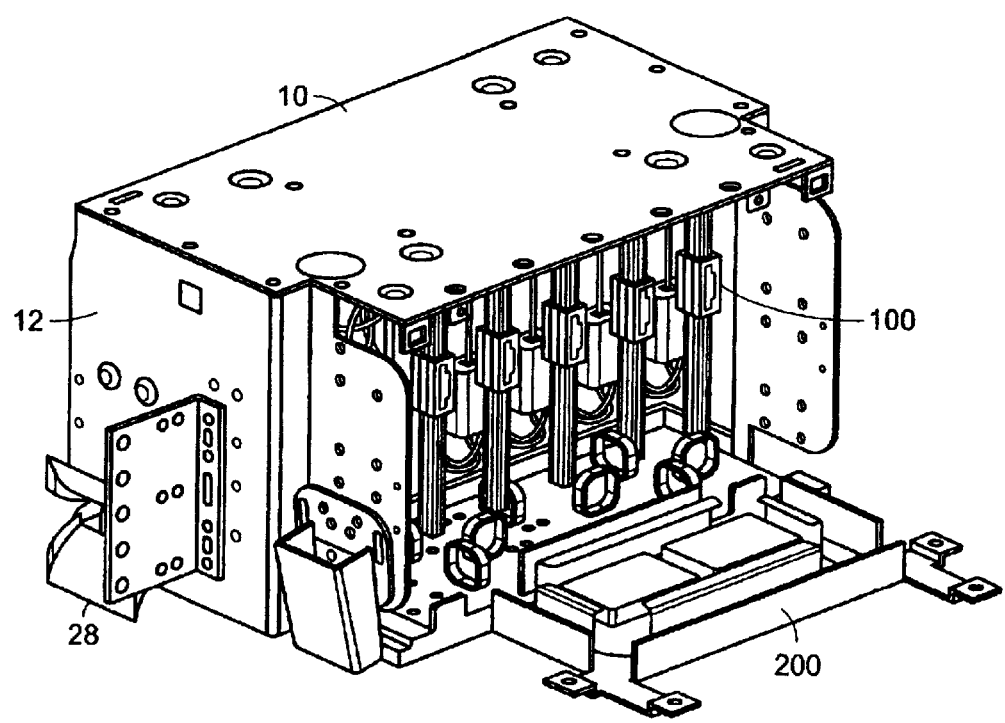
FIG. 3 is a rear perspective view of the enclosure of FIG. 1.
Figure 4:
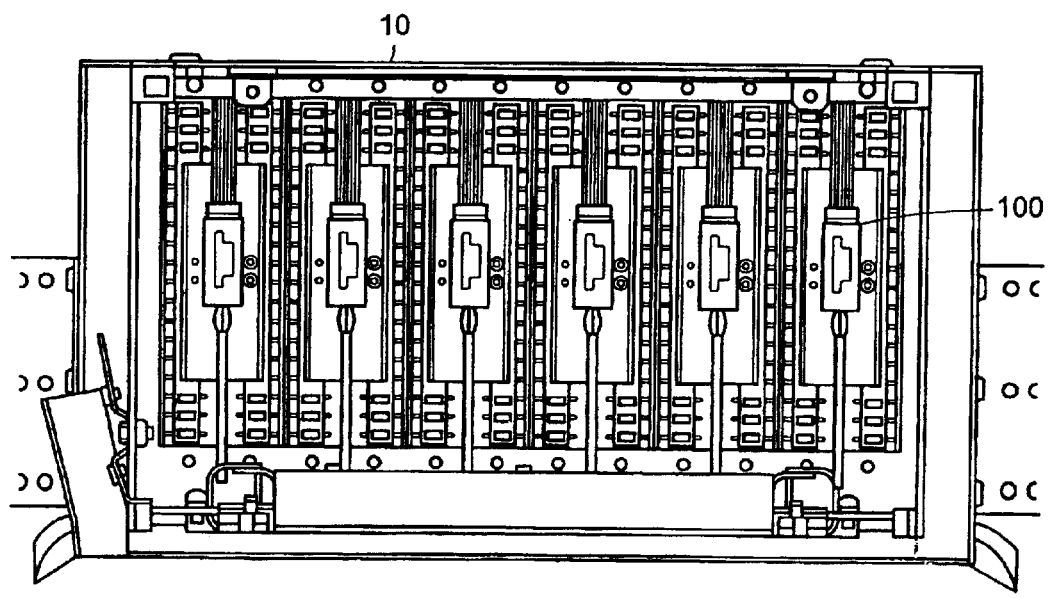
FIG. 4 is a rear view of the enclosure of FIG. 1.
Figure 5:
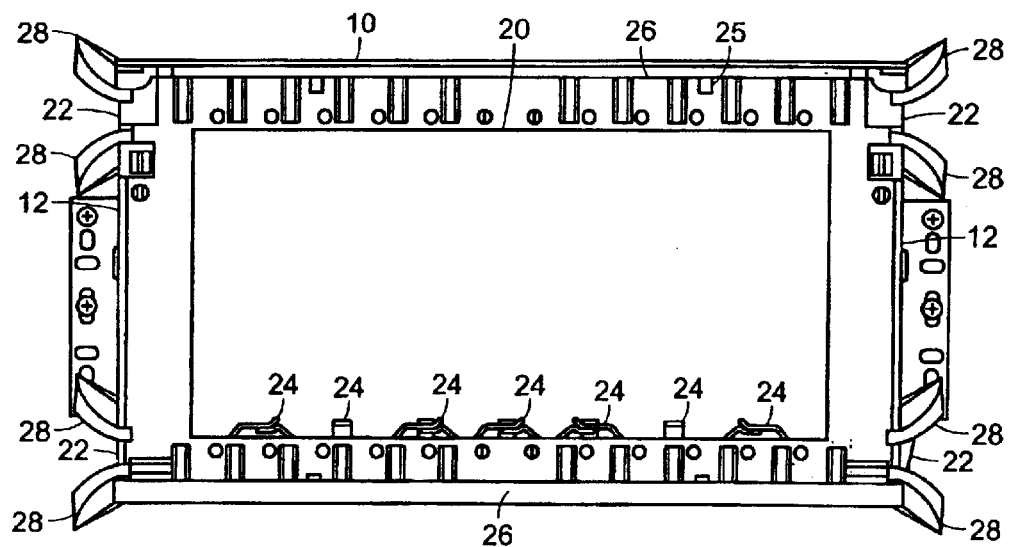
FIG. 5 is a front view of the enclosure of FIG. 1 with optical fiber cassettes removed.

FIGS. 1–5 illustrate an embodiment of an optical fiber enclosure. FIG. 1 is a front perspective view of the enclosure. The enclosure includes a housing 10 with sides 12 and front and rear compartments 14, 16 respectively, a bulkhead 20 and a splice module 200. Mounted to the bulkhead are optical fiber cassettes 100. FIG. 2 is a front view of the enclosure. FIG. 3 is a rear perspective view of the enclosure. FIG. 4 is a rear view of the enclosure. FIG. 5 is a front view of the enclosure with the optical fiber cassettes removed.

Figure 6:
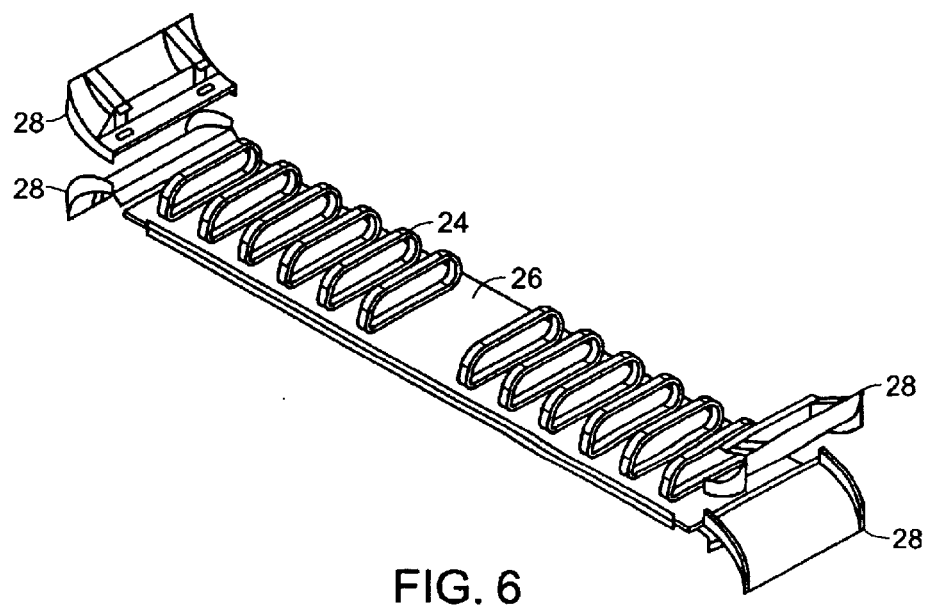
FIG. 6 is a perspective view of a front management plate in accordance with a preferred embodiment of the present invention.

The enclosure includes a sheet metal housing 10 with removable hinged front and rear doors. For fiber optic patching applications, a removable hinged bulkhead 20 divides the housing into a front and rear compartment with the rear compartment being deeper than the front. Removable panels, which contain various numbers of fiber optic adapters, are mounted to the bulkhead 10. In a typical application, fiber optic jumpers are routed to the front compartment for patching. Front access to the front compartment is through ports 22 at the top and bottom of both sides 12 with routing rings 24 positioned along a front management plate 26 mounted to the bottom of the housing 10 using nylatches 25 as shown in FIGS. 5 and 6. Front fiber management is improved by adding the ports at the top of each side with the ability to mount an additional front management plate 26 at the top of the housing 10. This feature can be used to accommodate applications in which the number of jumpers entering the enclosure is too great for the bottom ports alone. As noted above, current designs allow for management only on the bottom of an enclosure. Fiber radius guides 28, described further herein, are mounted to the housing to prevent sharp bends in the fiber as it enters the enclosure.

Figure 7A:
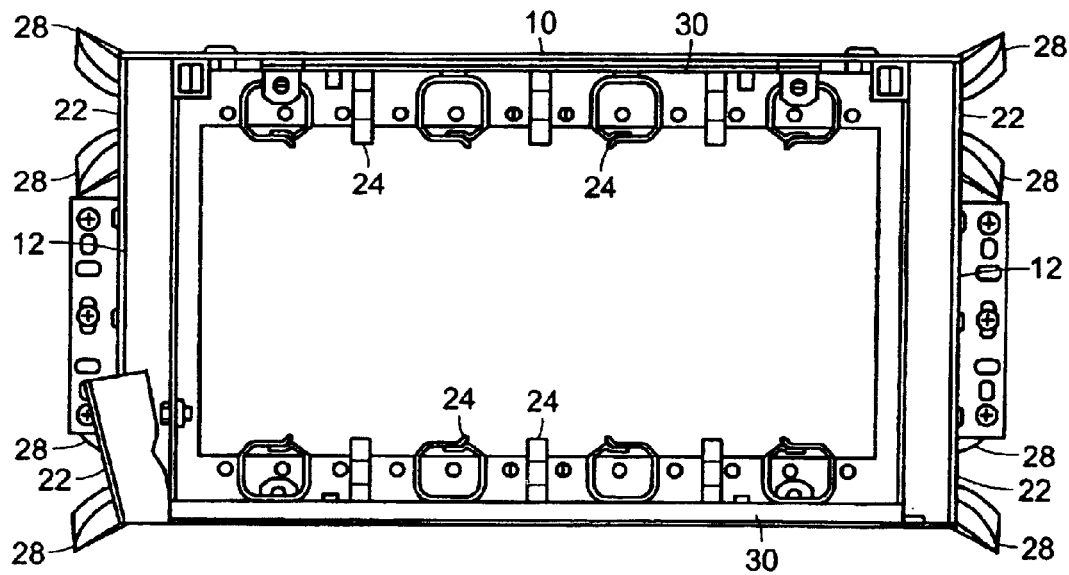
FIG. 7A is a rear view of the enclosure of FIG. 1 with optical fiber cassettes removed.
Figure 7B:
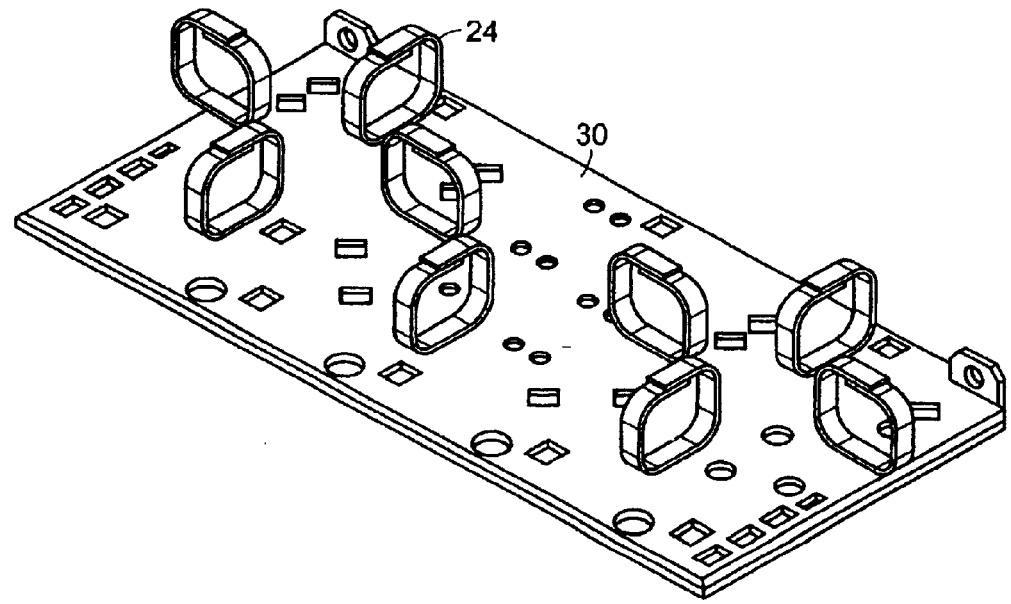
FIG. 7B is a perspective view of a rear, management plate in accordance with a preferred embodiment of the present invention.

In a typical application, fiber optic jumpers or bundled cable is routed to the rear compartment for patching. Rear access to the rear compartment is through ports 22 at the bottom and top of both sides with routing rings 24 positioned along a rear management plate 30 mounted to the top and bottom of the housing as shown in FIGS. 7A and 7B. Similar to the front fiber management, the rear fiber management is improved by providing the capability to mount the rear management plate 30 to the top of the enclosure to accommodate applications in which the number of fibers to be managed is too great for the bottom plate alone.

Figure 8A:
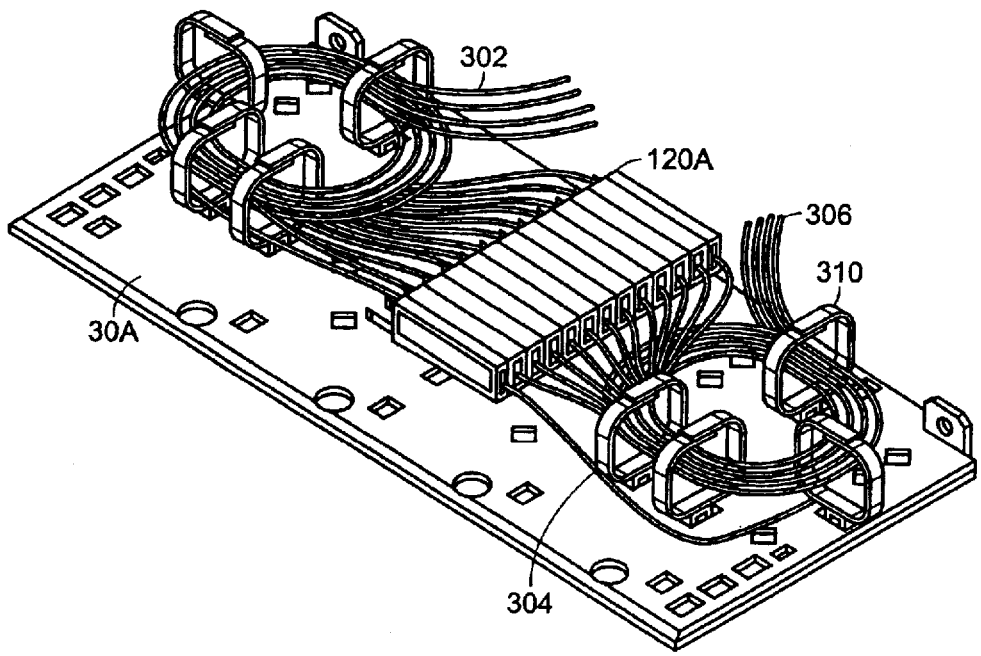
FIGS. 8A and 8B are perspective and front views, respectively, of a rear management plate with ribbon fanout devices mounted thereto in accordance with a preferred embodiment of the present invention.
Figure 8B:
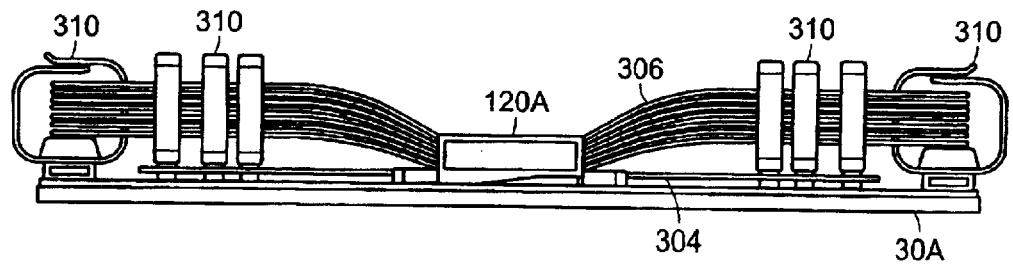

Referring now to FIGS. 8A and 8B, an improvement to the rear fiber management system is shown in which ribbon fanout devices 120A are mounted onto rear management plate 30A for fanning out individual fibers 302, 306 from ribbon cables 304 for routing management through saddles 310. This improvement is useful particularly in system applications in which ribbon cable 304 is required to be brought into the rear of the optical fiber enclosure or in which mass fusion splicing is done in the rear of the enclosure. The ribbon fanout devices 120A are each mounted orthogonal to the plane of the rear management plate. The ribbon fanout devices 120A are mounted in alternating directions for routing the exiting the fibers evenly to the left and right of the center mounting area.

Figure 8C:
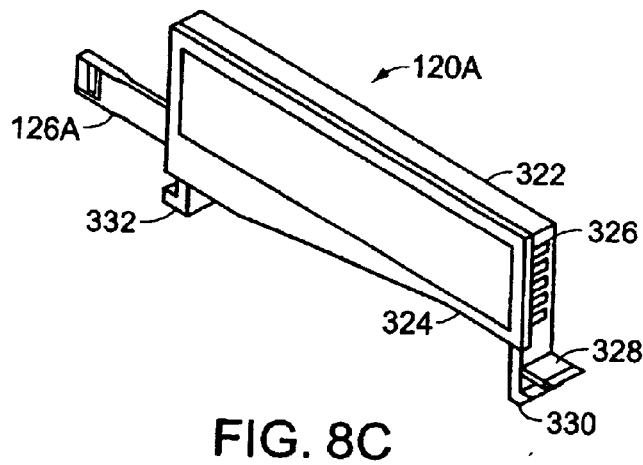
FIG. 8C is a perspective view of a ribbon fanout device in accordance with a preferred embodiment of the present invention.
Figure 8D:
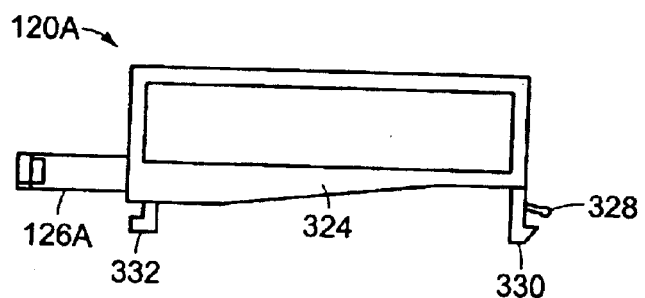
FIG. 8D is a plan view of the ribbon fanout device in accordance with a preferred embodiment of the present invention.
Figure 8E:
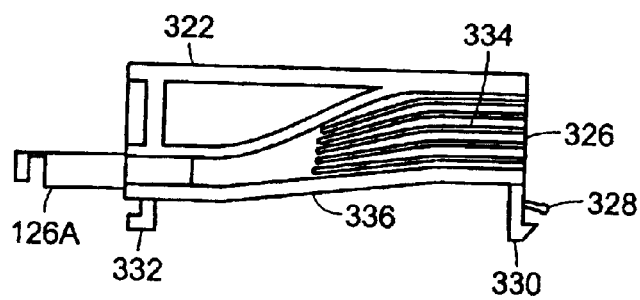
FIG. 8E is a plan view of the ribbon fanout device with the cover removed in accordance with a preferred embodiment of the present invention.
Figure 8F:
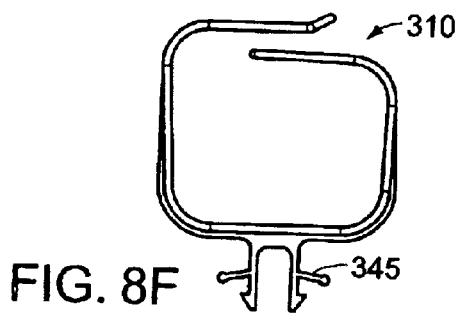
FIG. 8F is a plan view of a fiber saddle device in accordance with a preferred embodiment of the present invention.
Figure 9:
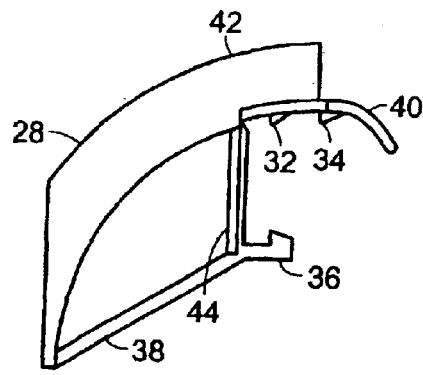
FIG. 9 is a side view of a fiber radius guide adapted for mounting to the enclosure of FIG. 1.
Figure 10:
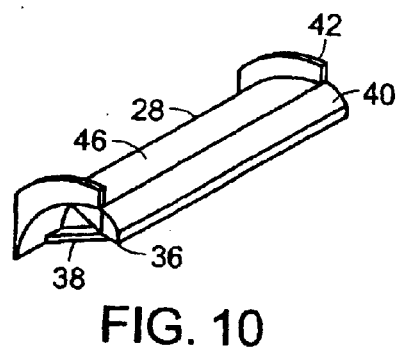
FIG. 10 is a top perspective view of the fiber radius guide of FIG. 9.
Figure 11:
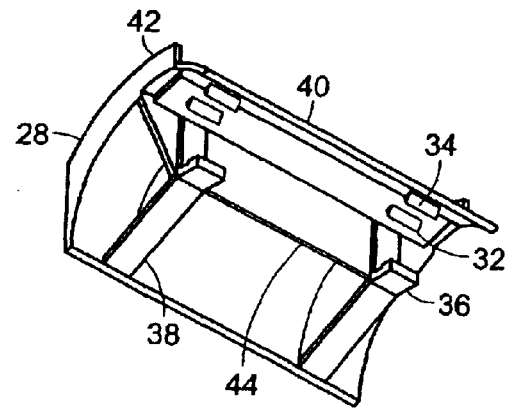
FIG. 11 is a bottom perspective view of the fiber radius guide of FIG. 9.
Figure 12:
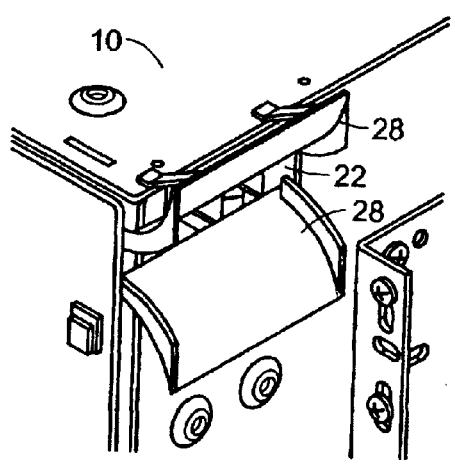
FIG. 12 is a top perspective view showing the fiber radius guide of FIG. 9 mounted to an upper portion of the enclosure of FIG. 1.
Figure 13:
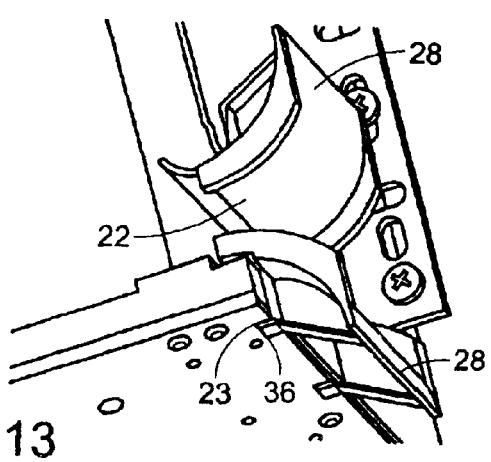
FIG. 13 is a bottom perspective view showing the fiber radius guide of FIG. 9 mounted to a lower portion of the enclosure of FIG. 1.

FIGS. 8C–8E show the ribbon fanout device 120A which includes a body 322 and a removable cover 324. Mounting to the management plate is facilitated by tabs 328, 330, 332 that snap into the plate. The fanout device also includes a ribbon cable termination 126A that is offset from a longitudinal axis of the device and relative to the individual fibers that exit the fanout device at exit ports 326. The fanout device further includes a fiber fanout section 334 that fans out the bundle of individual fibers in the ribbon cable to the exit ports 326. In this device, the angled contour 336 of the body 322 serves to elevate the individual fibers from the rear management plate to provide space for the ribbon cable to be routed below. To further facilitate routing of the fibers, a fiber saddle 310 (FIG. 8F) is provided which has tabs 345 for mounting to the plate. The fiber saddle 310 also elevates the individual fibers from the rear management plate to provide space for the ribbon cable to be routed below.

Thus it can be seen that the mounting orientation and cable offset facilitates looping of the ribbon cable underneath the fanout devices. This provides a layered fiber management with the ribbon cable located close to the surface of the rear management plate and the individual fibers managed above the ribbon cable.

Referring now to FIGS. 9 to 15, the fiber radius guide 28 is there shown. The guide 28 is a reversible, snap-on, plastic fiber radius guide adapted for mounting above and below each port 22 (FIGS. 5 and 7) to prevent any tight bends as the fiber enters the enclosure. A reversible guide reduces the number of parts inventoried and provides equal protection of the fibers whether they are routed from below or above the enclosure. The snap-on feature prevents the guides from falling off as they are exposed to moisture or age.

The guide 28 includes curved body 46 and a hood 40. A pair of first supports 38 extends from one end of curved body 46 and intersects a second support member 44 that extends from the other end of curved body 46. A pair of hooks 36 extend from the point at which the first and second members intersect. The hood 40 includes two pairs of barbs 32, 34 which oppose the pair of hooks 36.

When used to attach to the top or bottom of the enclosure, the hooks 36 engage slots in the top or bottom of the housing 10 and barbs 34 engage slots in the front or rear management plate. When used to attach to sides of the enclosure, the hooks 36 engage slots in the side and barbs 32 engage edges of cutouts in the housing as shown in FIGS. 12–15. The guide is symmetric for use on both left and right sides of the enclosure.

Figure 14:
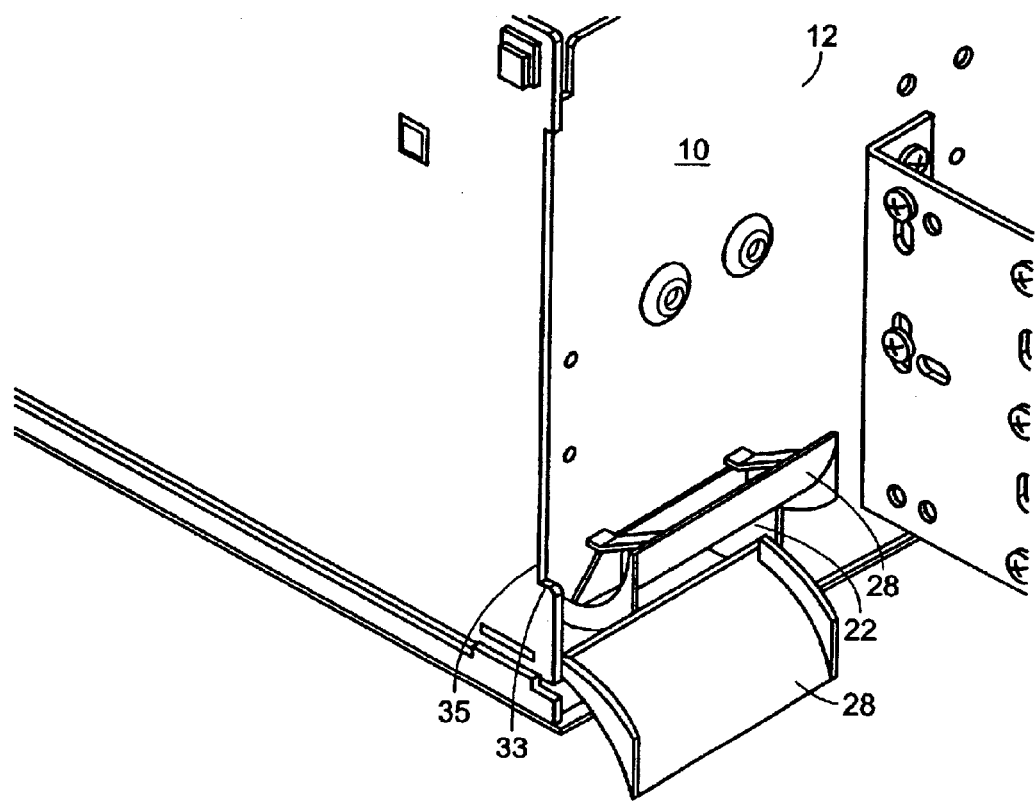
FIG. 14 is a top perspective view showing the fiber radius guide of FIG. 9 mounted to a lower portion of the enclosure of FIG. 1.
Figure 15:
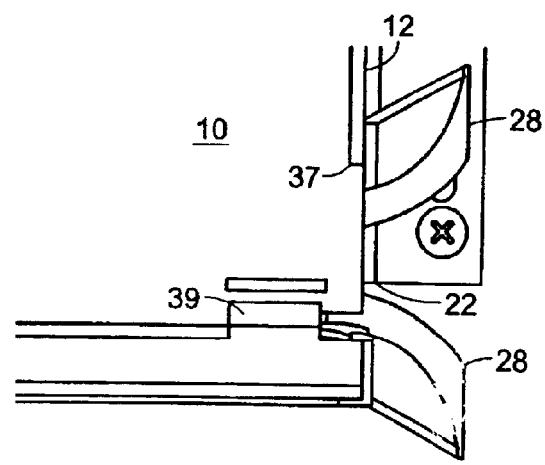
FIG. 15 is a side view showing the fiber radius guide of FIG. 9 mounted to a lower portion of the enclosure of FIG. 1.

Referring to FIGS. 14 and 15, improvements are now described that make the housing stronger and less likely to become damaged when the enclosure is dropped. Because the sides 12 are cut out to allow fiber ports, the housing is weakened. This can cause the door latches to break and the hinges to bend when the enclosure is dropped because the weak housing is relying on the latches and hinges for strength. The housing is strengthened by using notches 37 at the edges of the front and back door and bringing the sides 12 of the housing through the notches. This transfers forces between the sides and doors and lessens the forces being transmitted though the latches and hinges. Engagement areas 33, 35 are shown in FIG. 14. In addition, the hinges 39 are buttressed by bringing material directly underneath them to prevent them from bending.

Figure 16B:
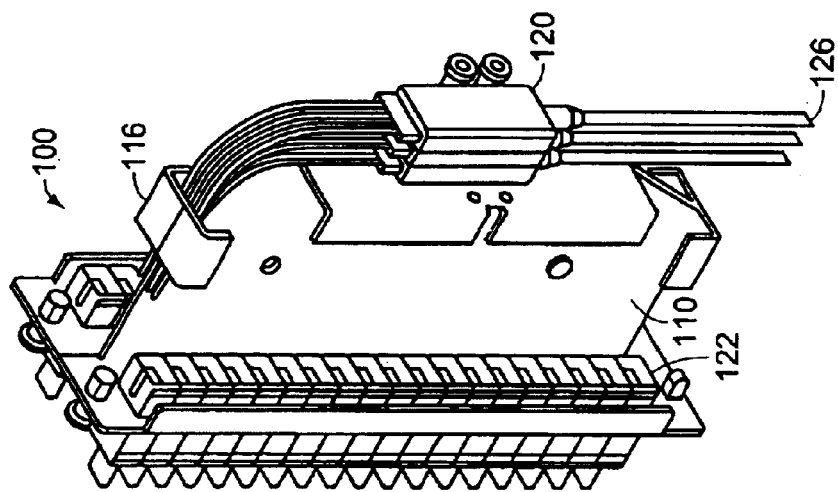
FIG. 16B is a rear perspective view of the optical fiber cassette in accordance with a preferred embodiment of the present invention.
Figure 16A:
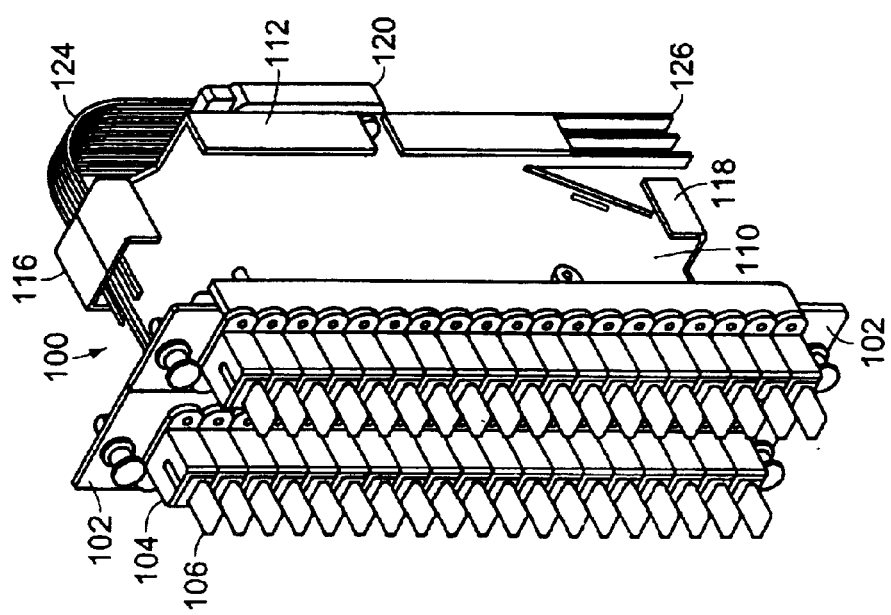
FIG. 16A is a front perspective view of an embodiment of an optical fiber cassette.

Referring now to FIGS. 16A and 16B, an embodiment of the optical fiber cassette 100 is shown. The optical fiber cassettes provide a way to pre-manage fiber optic pigtails to make the assembly more modular and allow manufacturing to be split up in stages.

In standard enclosures, fiber optic adapters are mounted to patch panels in groups from 6 to 24. The patch panels are then mounted to the bulkhead as noted in the background. Fiber optic jumpers are routed to the front of the adapters and fiber optic pigtails or terminated fiber optic cables are routed to the rear of the adapters. When large count fiber optic cable is used, the fiber is usually in the form of 12 fiber ribbon. For these ribbons to be terminated individually, the ribbons must be fanned out. There are currently many different fanout devices available. Typically, these fanout devices are mounted to the housing, usually on the bottom attached to the rear fiber management kit. Individual fibers are then routed from the fanout devices to the rear of the adapters. This "pre-wiring" of the enclosure is time consuming and must be done after the cable has been fanned out and connectorized.

To allow for separation of the stages of manufacture, an optical fiber cassette 100 is provided. The cassette 100 includes adapters 104, adapter plugs 106, fiber optic connectors 122, front face panel 102, side wall 110, rear face 112, fanout device 120 and ribbon pigtail 126. The cassette also includes keys 116, 118 for mounting the cassette to the bulkhead.

The adapters are mounted to the front face of the cassette. The side wall is attached between the front face and the rear face to provide space for optical fiber management. One or more fanout devices 120 are mounted to the rear face of the cassette and provide fanout of the ribbon pigtails 126 to individual optical fibers 124 that terminate at the fiber optic connectors. The fiber optic connectors are coupled to the adapters at the front face of the cassette. The space behind the adapters is used for optical fiber management. This area can be divided into layers and compartments for additional management of the fibers. The fiber management in the cassette is critical as the fibers can not be over bent.

The embodiment shown in FIGS. 16A and 16B is a double width device having two front face panels 102. Alternate embodiments of the cassette can have a single front face panel.

The cassettes can be assembled separately and used as needed when an enclosure needs a specific cable attached to it. The cassettes have built in fiber management to allow for ease of assembly and reduction in fiber breakage. Mounting of the fanout devices to the patch panels and managing the fiber between the fanout block and the adapters provides an integrated assembly.

The embodiment shown in FIGS. 16A and 16B is referred to as a closed cassette and provides fiber management in a predetermined route. This embodiment is useful for handling varying terminated fiber lengths due to manufacturing yields.

Figure 17B:
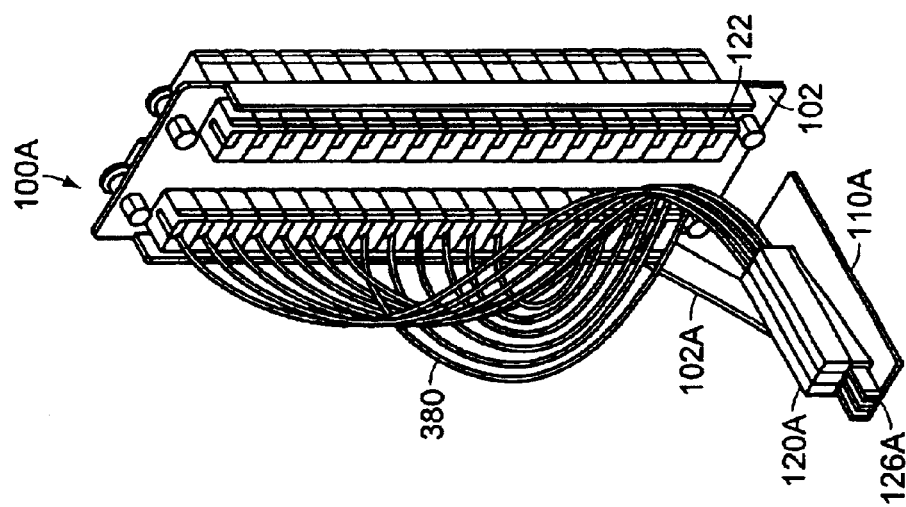
FIG. 17B is a rear perspective view of the optical fiber cassette in accordance with the embodiment illustrated in FIG. 17A.
Figure 17A:
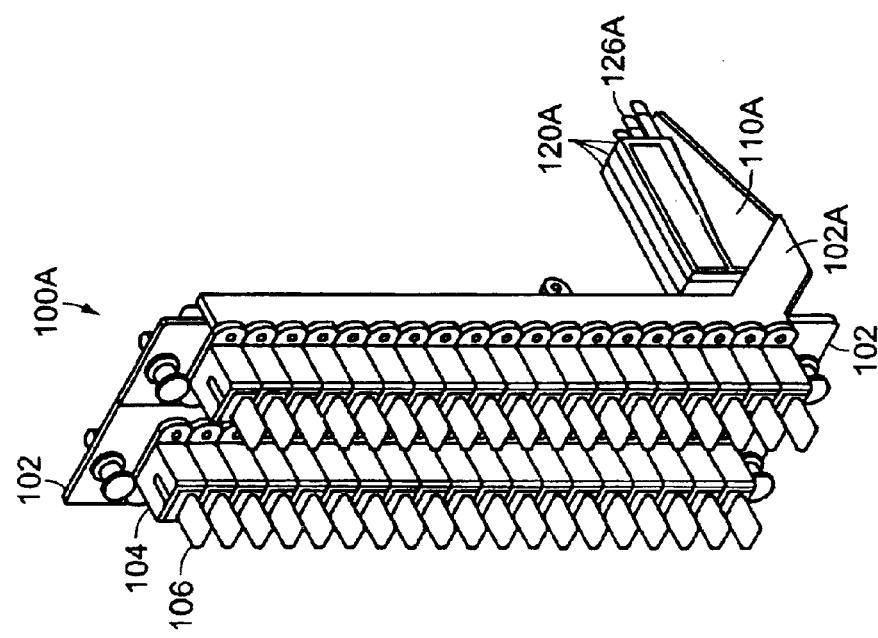
FIG. 17A is a front perspective view of a second embodiment of an optical fiber cassette.

Typically, the connectors 122 need to be available for routine cleaning and inspection. Access to the rear connectors is important since the fibers are managed behind the adapters 104. A second embodiment of a cassette 100A that provides improved access to the connectors is referred to herein as an open cassette and is shown in FIGS. 17A and 17B. In this embodiment, the fanout devices 120A are mounted in close proximity to the front of the cassette or directly to the front panel 102. The fibers 380 between the fanout devices 120A and the connectors are left floating or are managed minimally while still allowing access and removal from the rear of the cassette.

The cassette 100A includes adapters 104, adapter plugs 106, fiber optic connectors 122, front face panel 102, mounting plate 10A, panel arm 102A and fanout devices 120A.

The adapters are mounted to the front face of the cassette. The panel arm 102A extends from the panel and is attached to mounting plate 100A. One or more fanout devices 120A are mounted on the mounting plate 100A and provide fanout of ribbon cables to individual optical fibers 380 that terminate at the fiber optic connectors. The fiber optic connectors are coupled to the adapters at the front face of the cassette. The space behind the adapters is used for optical fiber management.

Figure 20:
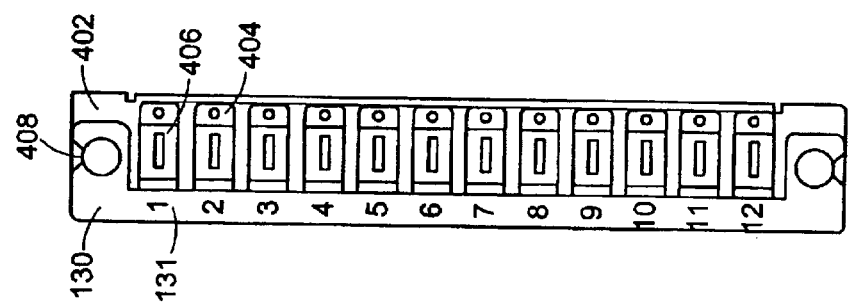
FIG. 20 is a front view of the adapter panel with the mounted assignment tab in accordance with a preferred embodiment of the present invention.
Figure 19:
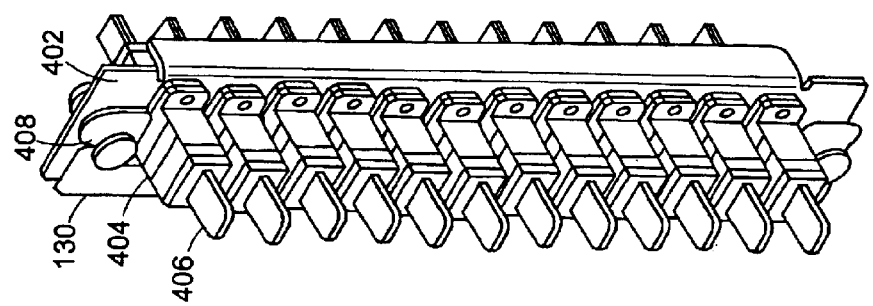
FIG. 19 is a perspective view of an adapter panel with the assignment tab of FIG. 18 mounted thereto.
Figure 18:
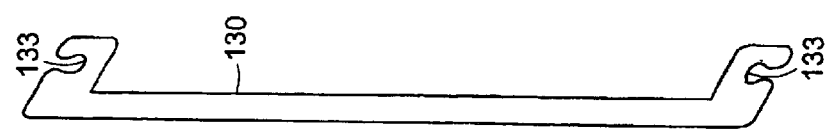
FIG. 18 is a perspective view of an assignment tab in accordance with a preferred embodiment of the present invention.
Figure 26:
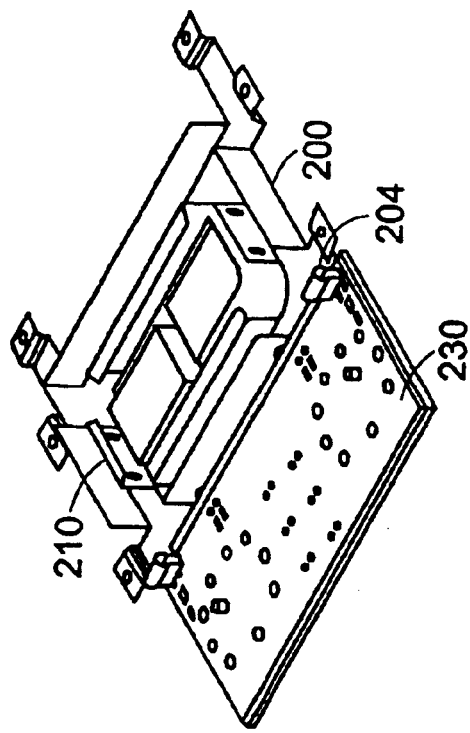
FIG. 26 is a front perspective view of the fold down splice module in the opened position and cover removed.
Figure 25:
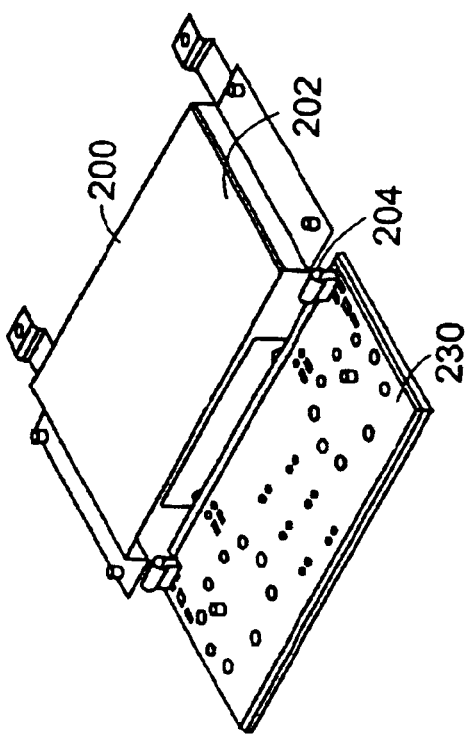
FIG. 25 is a front perspective view of the fold down splice module in the opened position.

Referring to FIGS. 18–20, an improvement to the labeling of adapters for location tracking purposes is now described. FIG. 18 shows an assignment tab 130. FIGS. 19 and 20 show the assignment tab 130 attached to an adapter panel 402 which includes adapters 404 and plugs 406. It should be noted that the assignment tab also can be used with the cassettes described above (FIGS. 16–17).

The assignment tab 130 includes openings 133 which can be secured or fitted around nylatches 408 located at the top and bottom of the adapter panel. By adding a removable assignment tab 130, it becomes easier to label, read and relabel the adapter locations. Adhesive labels 131 (FIG. 20) are placed onto this tab which can be made from a PVC sheet. Currently, adhesive labels are applied directly to the adapter panel next to the corresponding adapter. Because of the size of the adapters, little room is available for labeling and the numbers become hard to read. Other known assignment tabs allow for numbers to be written; however, such tabs cannot be removed without disconnecting the fiber optic jumpers because the tab is placed around the adapters. The present assignment tab 130 is located only on one side of the adapters, thus allowing it to be removed without disturbing the connected fibers.

Referring to FIGS. 21 to 26, the rear splice modules are now described. A rear splice module 200 provides the capability to manage mass fusion (ribbon fiber) splicing in the rear compartment of the enclosure.

Standard enclosures address splicing by pre-stubbing the enclosure, that is, attaching a length of cable to the enclosure and pre-wiring the rear with the fiber. This allows installers to do less in the field, and limits the exposure of unprotected connectorized ends of cable. A problem with this method is that the length of cable needs to be known prior to installation and the route of installation needs to start at the intended location of the enclosure. It often times is easier to install raw cable as needed and place it into the enclosure when it is in place. Because it is extremely cumbersome and time consuming to connectorize and polish fiber optic connectors in the field, it is preferable to provide a pre-wired enclosure with pigtails with splicing of the cables to the pigtails.

In the past, an enclosure would be prewired for patching and a separate enclosure would be used to house the splices with the pigtails going between the two enclosures. As demand for optical fibers increases, so does the need to get as many fibers as possible into smaller spaces. This is one reason to consolidate and place the splices directly into the rear of the patch enclosure as provided in the present system. This also makes in plant manufacturing easier, avoiding the need to have the multiple fibers broken out, connectorized, and prewired into the enclosure. By connectorizing pigtails and splicing a cable onto them in the plant, the pigtails can be mass-produced at a different location. This allows for flexible manufacturing and possible reduction in cost and lead-time.

The fold down splice module 200 mounts in place of the rear management plate. It includes a similar rear management plate 230 with hinges 204 on it, a door 201 that holds the splices or splice tray and manages fiber, and a cover 202 to protect the splices and managed fiber. In the closed position as shown in FIG. 21, the door 201 mounts vertically, directly inside the rear door and is attached to a rear management plate attached to the top of the housing. To open the splice door 201, the rear door is removed and the splice door is detached from the top rear plate. The splice door pivots on the hinges and comes to rest horizontally on the bottom of the housing. This makes the splices readily available and also allows for access to the rear of the patch connections.

The splices can be mounted directly to the splice door or mounted in a removable splice tray 210. A predetermined amount of slack is also managed by the splice door, allowing the splice to be removed for servicing. Pigtails (ribbon) are routed from the bottom rear management plate 230 and onto the splice door with enough slack to accommodate the pivoting of the door.

Figure 27:
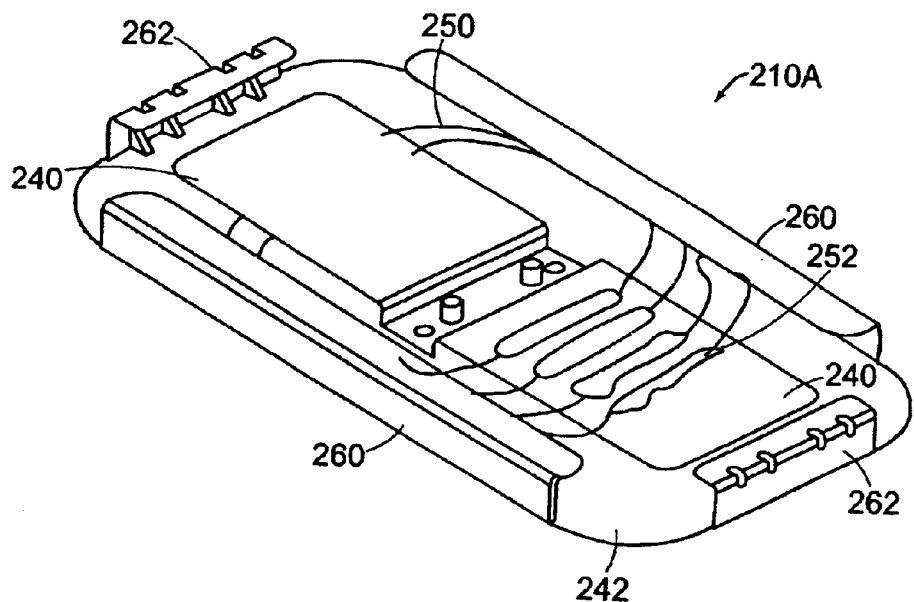
FIG. 27 is a perspective view of a first embodiment of a splice tray.
Figure 28:
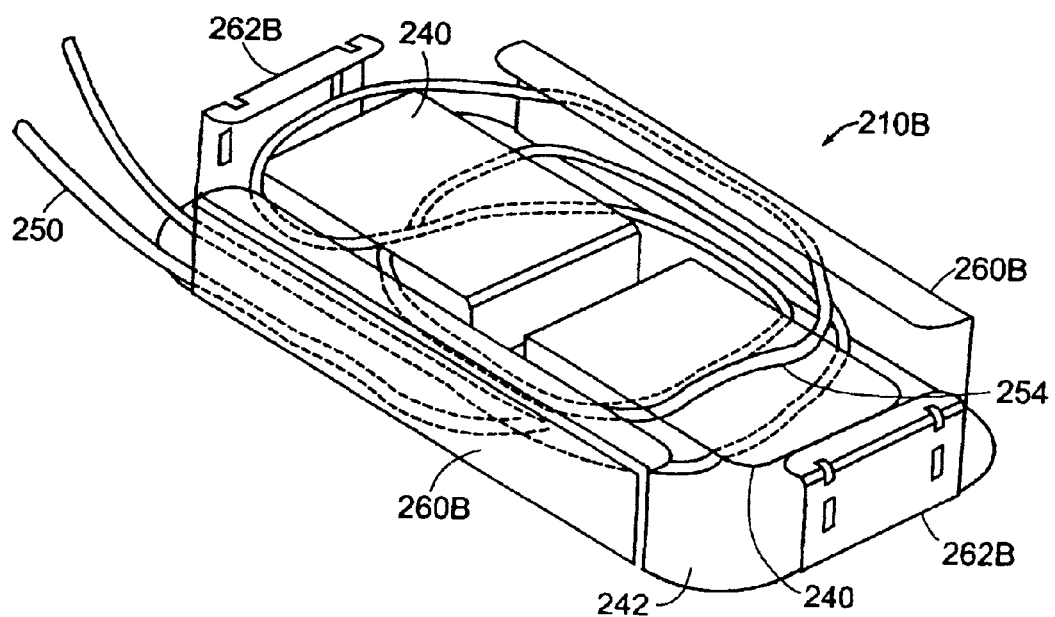
FIG. 28 is a perspective view of a second embodiment of a splice tray.
Figure 30:
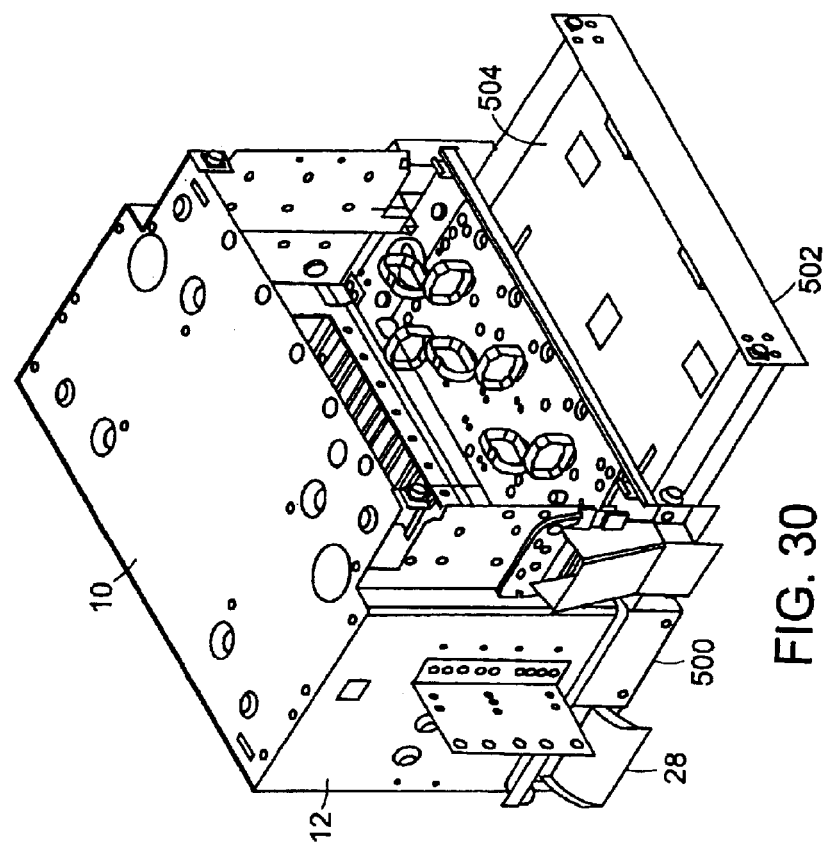
FIG. 30 is a rear perspective view of the enclosure of FIG. 1 with the drawer splice module in an opened position.
Figure 29:
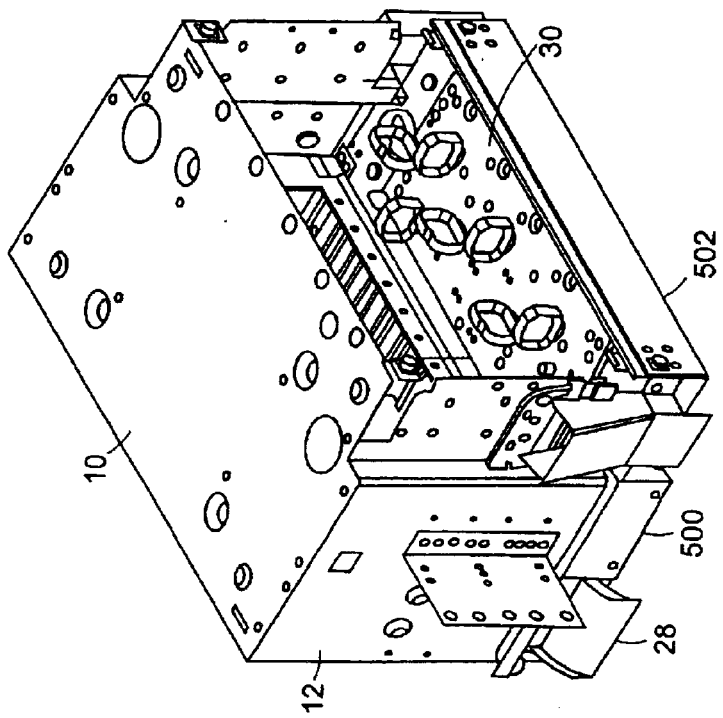
FIG. 29 is a rear perspective view of the enclosure of FIG. 1 with a drawer splice module in a closed position.
Figure 32:
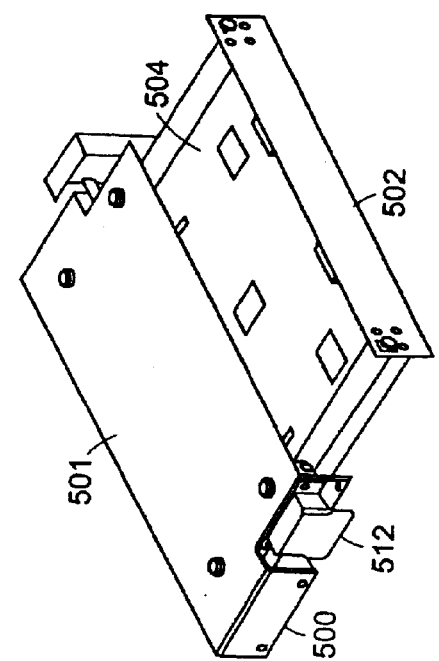
FIG. 32 is a top perspective view of the drawer splice module in the opened position.
Figure 34:
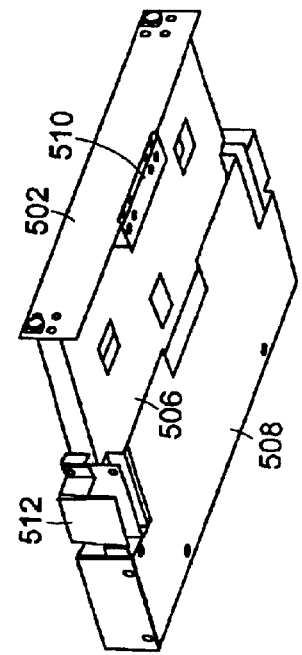
FIG. 34 is a bottom perspective view of the drawer splice module in the opened position.
Figure 31:
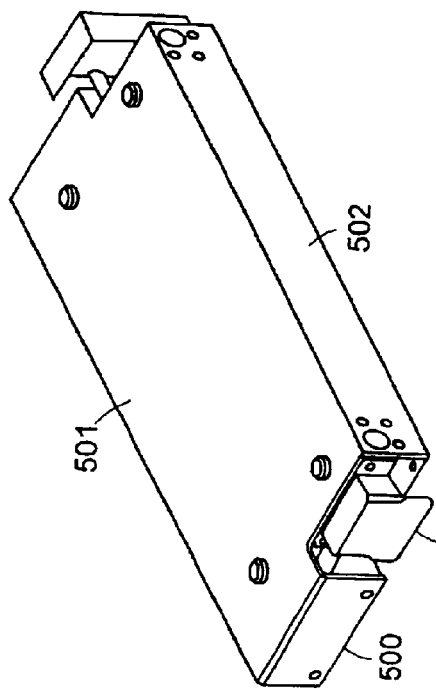
FIG. 31 is a top perspective view of the drawer splice module in the closed position.
Figure 33:
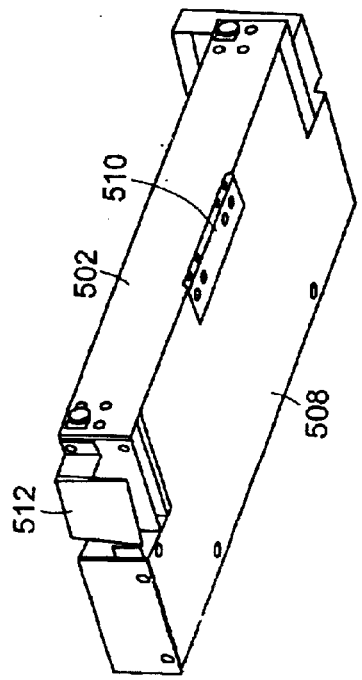
FIG. 33 is a bottom perspective view of the drawer splice module in the closed position.

Referring to FIGS. 27 and 28, the splice tray 210 is now described. Standard splice trays currently available essentially mount the splices to the floor of the tray and manage fiber slack loops around the splices. Trays have different levels of fiber management to store and protect the fibers. This method has some drawbacks. By managing the excess fiber around the splices and in specified management path, the length of the fiber needs to be correct or the fiber will bend or be pulled. To splice, an operator needs to cut the fiber to the specific length. Also, if a splice is done incorrectly, the fiber needs to cut back one complete loop to be the correct length again. Also, this method does not work well with ribbon fiber. Because ribbon fiber is thin and wide, it occupies a large amount of space when laid on top of each other. Having the ribbon mass fusion splices at the same level as the management loops is difficult to do because the ribbon usually needs to be routed over itself.

To avoid the above problems, a two layered splice tray is provided in the present system. The trays 210 include floor 242, sides 260, 262 and a pair of splice plates 240. The trays are made deeper and a second layer (splice plates 240) added to mount the splices to while allowing the management loops to go under the splices. This eliminated the need for accurate cut lengths while splicing and only needing to cut a small amount of fiber if the splice is done incorrectly. This also reduced the amount of fiber needing to be managed as the multiple loops placed for resplicing can be replaced with a smaller length. The splice tray 210A in FIG. 27 shows individual splices 252 for fiber 250. A doubly deep splice tray 210B to manage ribbon mass fusion splices 254 provides ample room to cross ribbons 250 over each other as shown in the embodiment of FIG. 28.

Referring now to FIGS. 29 to 36, a drawer splice module 500 is shown. The drawer splice module 500 includes a drawer that mounts under the rear management plate 30 (FIGS. 29 and 30) for holding the splices and managing fibers. The drawer can either be inside the enclosure or in a separate housing directly under and attached to the rear of the enclosure. In the embodiment shown, the drawer module 500 is contained in a separate housing (FIGS. 31 to 36) and includes a top plate 501, drawer 502, drawer floor 504, bottom plate 508, fiber cable ports 512, drawer pass-through ports 518 and cable pass-through plate 510.

The splices can be mounted directly to the splice drawer or mounted in a removable splice tray such as the splice tray described above with respect to FIGS. 27 and 28. A predetermined amount of slack can also be managed by the splice drawer, allowing the splice to be removed for servicing. Pigtails (ribbon) 900 are routed from the rear of the enclosure and into the splice drawer with enough slack to accommodate the sliding of the drawer. A recess 506 is provided by the offset bottom 508 to accommodate fiber storage. In an alternate embodiment, the drawer can be placed directly under the rear management plate in a flat bottomed enclosure with the fibers routed into the drawer for splicing.

Placement of a drawer to accommodate splicing at the back of the cabinet, whether mounted external to the enclosure or located inside of the enclosure is an improvement over prior approaches.

Entrance of the optical fiber into the drawer through the ports 518 and the management of the slack needed to pull the drawer in and out is also improved. The biggest difficulty with utilizing a sliding drawer system with optical fiber is the necessity of slack, which allows the drawer to be pulled out. When the drawer is pushed back in, this slack needs to be managed and enough room needs to be allocated to prevent the fibers from being over bent or damaged.

Figure 36:
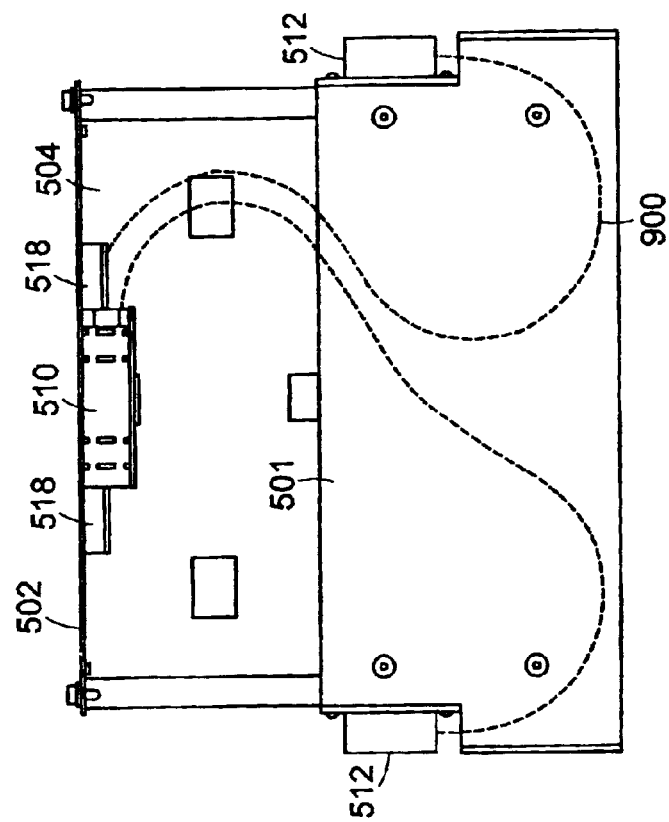
FIG. 36 is a top view of the drawer splice module in the opened position.
Figure 35:
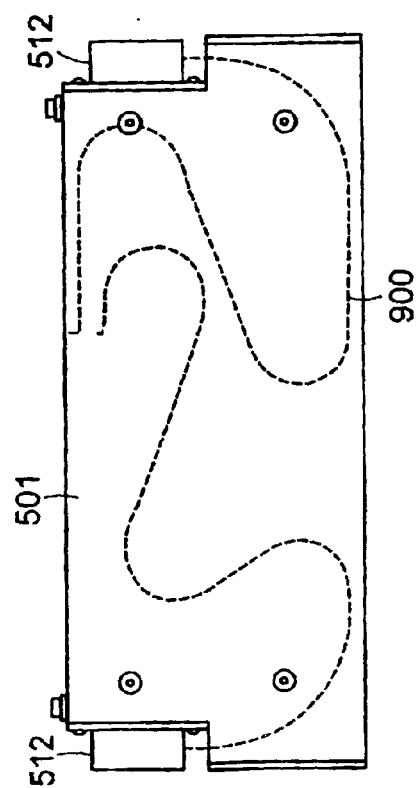
FIG. 35 is a top view of the drawer splice module in the closed position.

The system shown in FIGS. 29 to 36 provides a configuration which routes the slack fiber directly under the drawer itself and enters the drawer in the front. The space under the drawer is used to store the slack fiber in a "S" bend for fiber 900 as shown in FIGS. 35 and 36. As the drawer is pulled out, the "S" bend elongates and as the drawer is pushed back in, the "S" bend compresses. The "S" bend is configured to prevent the fiber from becoming over bent. As shown, fibers enter the storage space from both sides. In an alternate embodiment, all fibers can enter the storage space from the same side.

There are many different types of fiber optic adapters. Some adapters mount using a threaded body and a nut while others use flanges and screws. A few snap into thin panels; however, to remove them requires squeeze tabs on the rear of the adapter, and this is not useful when rear access is not possible.

The present approach provides a tab system of snapping adapters into a thin panel, which is removable from the front side of the panel. The improvement includes the incorporation of disengagable snaps directly into the plastic adapter body.

Figure 37A:
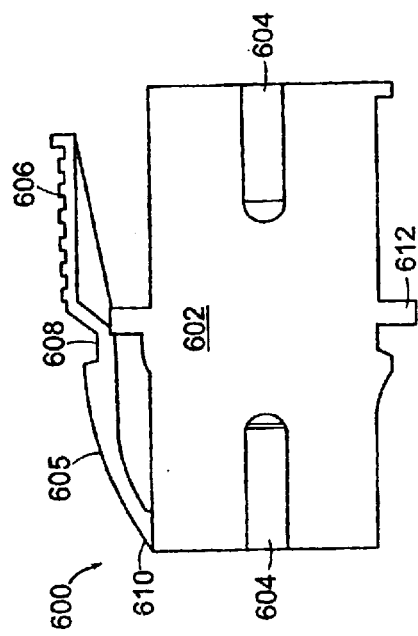
FIGS. 37A and 37B illustrate perspective and plan views, respectively, of a first embodiment of a removable adapter.
Figure 37B:
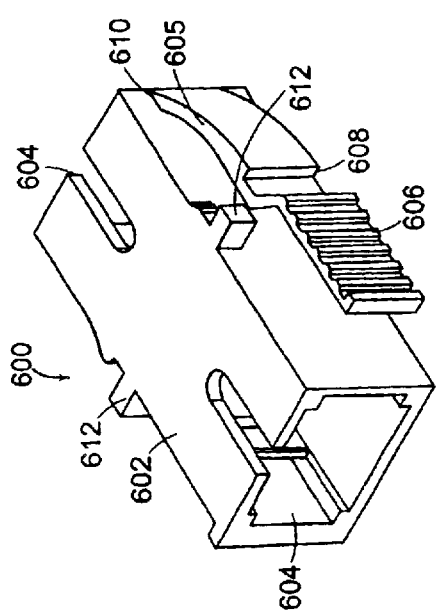
Figure 38B:
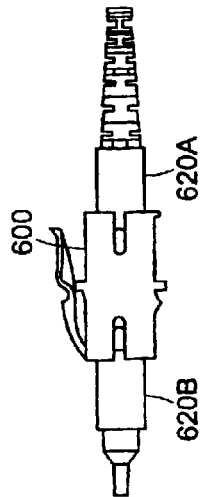
FIGS. 38A and 38B illustrate perspective and plan views, respectively, of the removable adapter of FIGS. 37A, 37B having pigtail connectors engaged with the adapter.
Figure 38A:
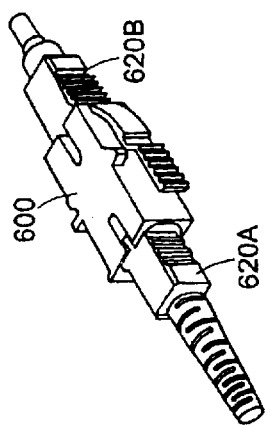

A first embodiment of a removable adapter is shown in FIGS. 37A and 37B. The adapter 600, preferably made of plastic, includes a body 602, connector recesses 604, engagement member 605 and location bosses 612. The engagement member 605 includes a hinge 610, finger tab 606 and engagement tang or tab 608. FIGS. 38A and 38B show the adapter 600 with connector pigtails 620A, 620B mounted to the recesses 604.

Figure 39B:
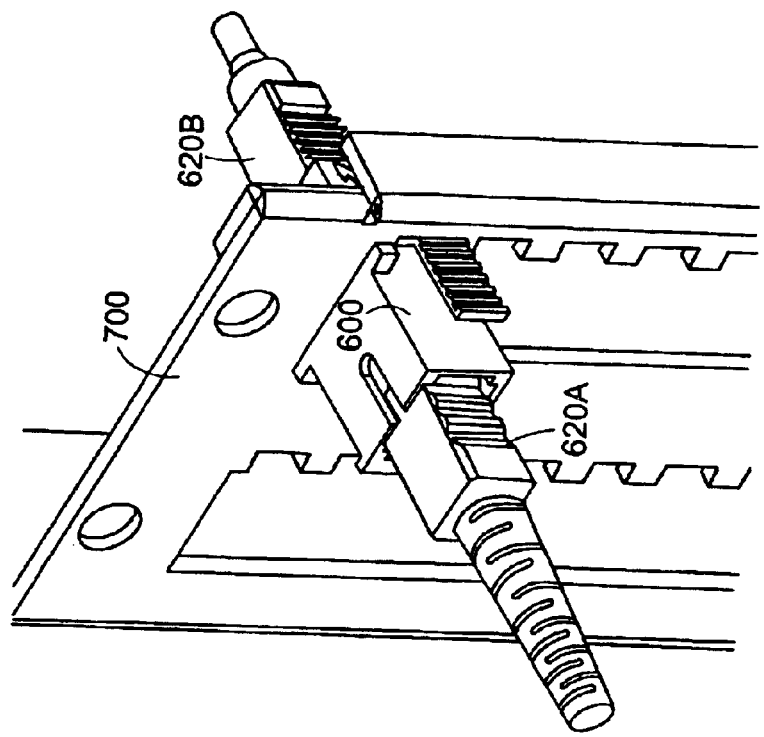
FIGS. 39A and 39B illustrate perspective views of the adapter of FIGS. 37A, 37B and FIGS. 38A, 38B, respectively, mounted to an adapter panel.
Figure 39A:
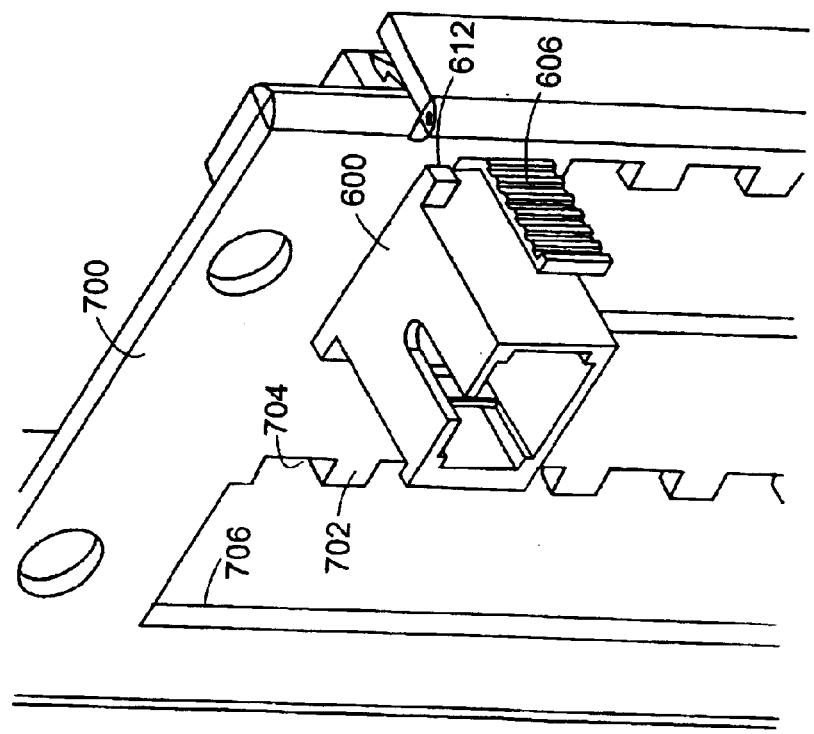

As shown in FIGS. 39A and 39B, the adapter can be mounted to an adapter panel 700. The panel has a cutout 706 that includes a plurality of slots 704 on the right side. The finger tab 606 sits in the slot 704 and the engagement tang snaps into the slot for holding the adapter in place in the panel. The adapter is disengaged by squeezing the finger tab 606 and removing the adapter from the slot.

A second embodiment of a removable adapter is shown in FIGS. 40A and 40B. The adapter 650, preferably made of plastic, includes a body 652, connector recesses 658, engagement members 655 and location bosses 652. The engagement member 655 is partially recessed into the body 652 and includes a hinge 660, tab 654 and engagement tang or tab 656. FIGS. 41A and 41B show the adapter 650 with connector pigtails 670A, 670B mounted to the recesses 658.

As shown in FIG. 42, the adapter can be mounted to an adapter panel 700A. The panel has a cutout 706A that includes a plurality of slots 708a, 708B on the left and right sides, respectively. The engagement tangs 656 snap into the slots for holding the adapter in place in the panel. The adapter is disengaged by squeezing the two tabs 654 inwardly using tool 800 (FIG. 43) to depress the engagement tangs 656 and remove the adapter from the slot. To prevent the adapters from sliding into each other when deployed in aggregates, the cutouts in the corresponding panel are notched. This notch engages either the tab itself or a protrusion in the adapter.

It should be understood that embodiments of the adapter can be modified to fit SC, LC, MT, MTRJ and any other adapter style.

The tool 800 (FIG. 44) includes a body 806 and a pair of fingers 802 which are placed on either side of the adapter. Protrusions 808 and recesses 804 in the tool fingers engage in corresponding recesses and protrusions in the removable adapter. The tool allows the engagement area on the tab of the adapter to be smaller and therefore reduce the footprint of the adapter.

The adapters can be used in the cassette embodiments described above. When removing the adapters, the connector on the rear side of the adapter are made accessible. By allowing the connectors to be accessed and removed through the front of the cassette, the rear of the cassette becomes free to use for fiber management.

Referring to the drawings in detail, where like numerals indicate like elements, there is illustrated an integrated optical connector and coupler in accordance with the present invention designated generally as 1020.

Figure 45:
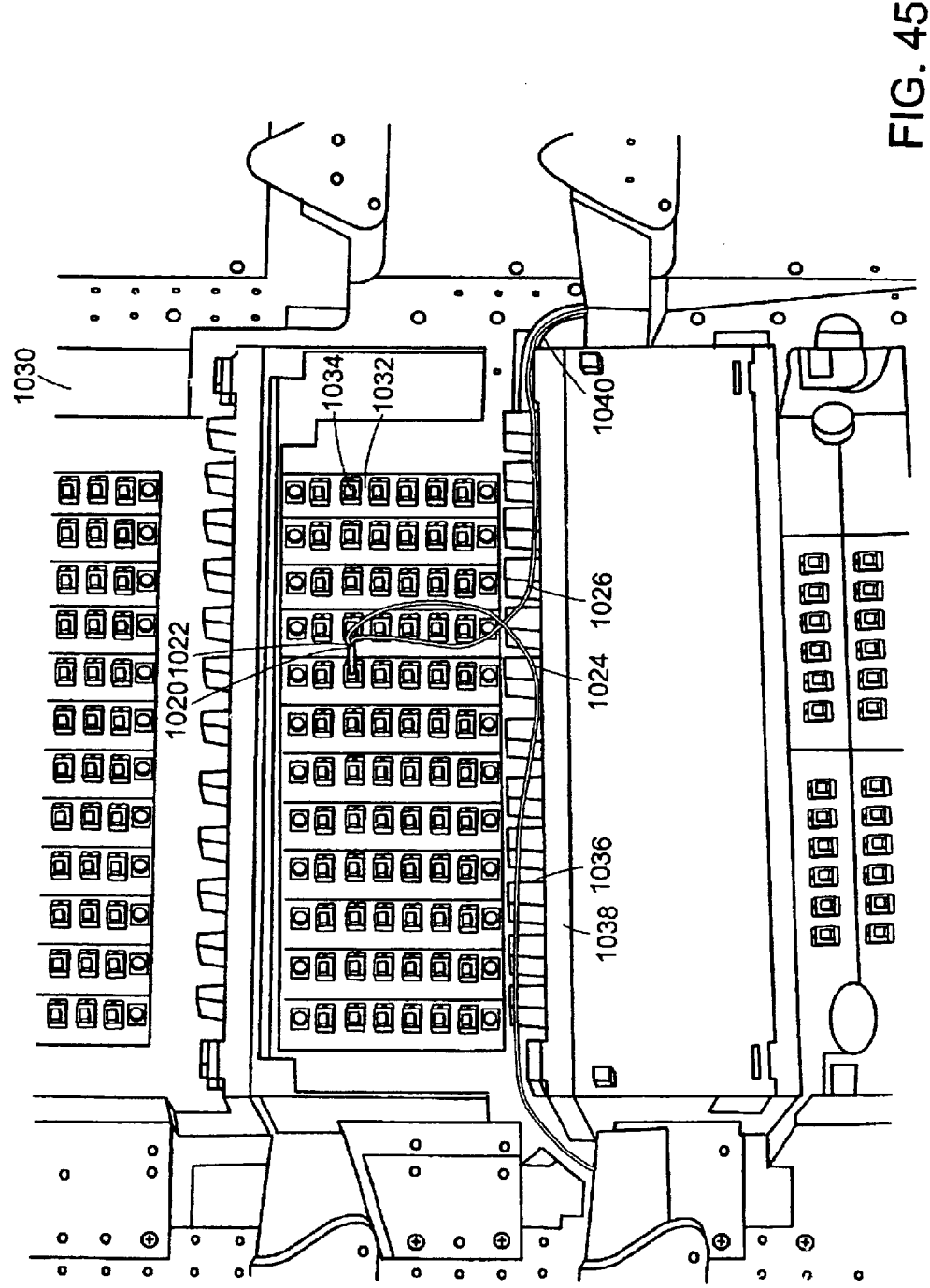
FIG. 45 is a front view of an optical fiber housing with a plurality of optical fiber cassettes each with a plurality of adapters. An integrated optical connector and coupler according to a preferred embodiment of the present invention are connected to one of the adapters.

Referring to FIG. 45, an optical fiber housing 1030 is shown with a plurality of optical fiber cassettes 1032. Each optical fiber cassette 1032 has a plurality of adapters 1034. The integrated optical coupler and connector 1020 according to a preferred embodiment of the present invention has a connector and splitter portion 1022 connected to one of the adapters 1034. The integral optical coupler and connector 1020 has a pair of optical cables 1024 and 1026 that extend from the connector and splitter portion 1022. Each of the cables 1024 and 1026 is shown routed through a plurality of routing rings 1036 on a management plate 1038. The cables 1024 and 1026 extend through fiber radius guides 1040. The optical fiber housing 1030 with a management plate and fiber radius groove are further described in U.S. patent application, filed Feb. 12, 2002, having an Ser. No. 10/074,267 entitled "Optical Fiber Enclosure System" listing Steven John Schray as inventor, the entire contents of the application being incorporated herein by reference.

Figure 46:
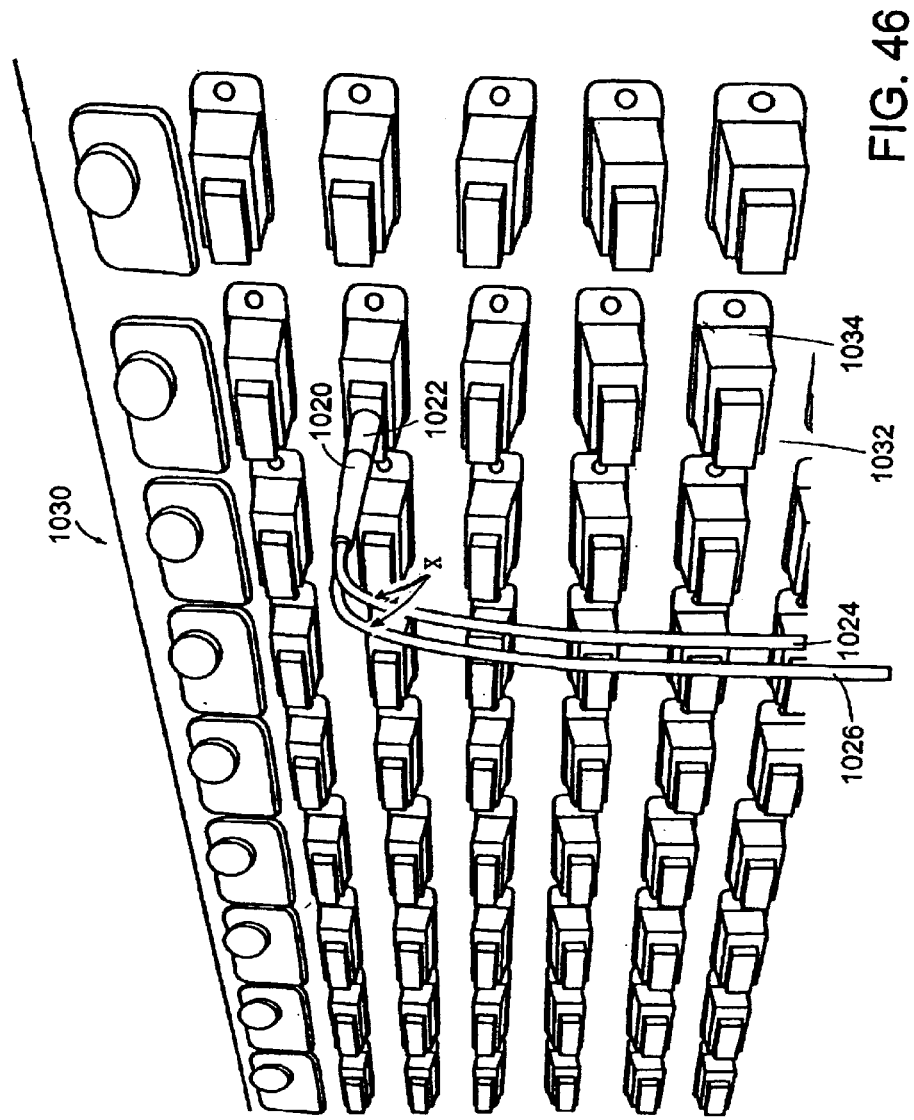
FIG. 46 is an enlarged view of the integrated optical connector and coupler connected to one of the adapters of the optical fiber housing in accordance with a preferred embodiment of the present invention.

Referring to FIG. 46, an enlarged view of a portion of the optical fiber housing 1030 is shown. The connector and splitter portion 1022 of the integrated optical coupler and connector 1020 is connected to one of the adapters 1034 of an optical fiber cassette 1032. The optical cables 1024 and 1026 extend from the connector and splitter portion 1022 of the integrated optical coupler and connector 1020. The bend radius shown as dimension X, of the optical cables 1024 and 1026 does not exceed approximately 1.5 inches thus enabling ease of closure of panel door. In preferred embodiments, the integrated optical connector coupler is constructed in a compact package such that when installed in the optical fiber enclosure no part of the coupler connector assembly protrudes beyond the footprint of the fiber enclosure and yet maintains an industry recommended minimum bend radius of 1.5 inches on the output cable ports thus allowing the fiber enclosure front panel to close without impinging on the cables of the assembly.

Figure 47:
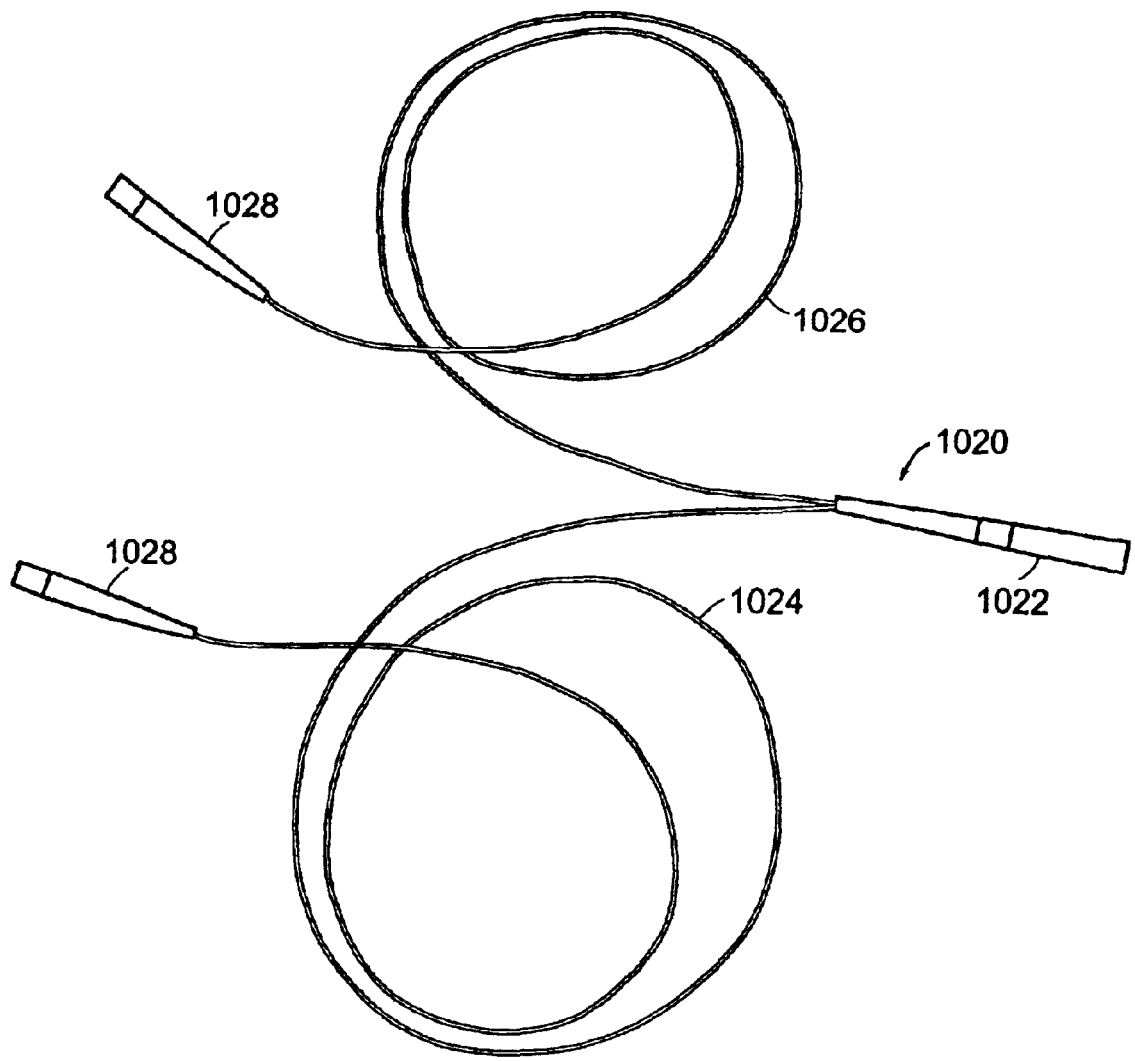
FIG. 47 is a top view of the integrated optical connector and coupler in accordance with a preferred embodiment of the present invention.

A top view of the integrated optical coupler and connector 1020 is shown in FIG. 47. The integrated optical coupler and connector 1020 has at one end the connector and splitter portion 1022 from which extends the pair of optical cables 1024 and 1026. At the end of each of the optical cables 1024 and 1026 is located an optical connector 1028.

Figure 48:
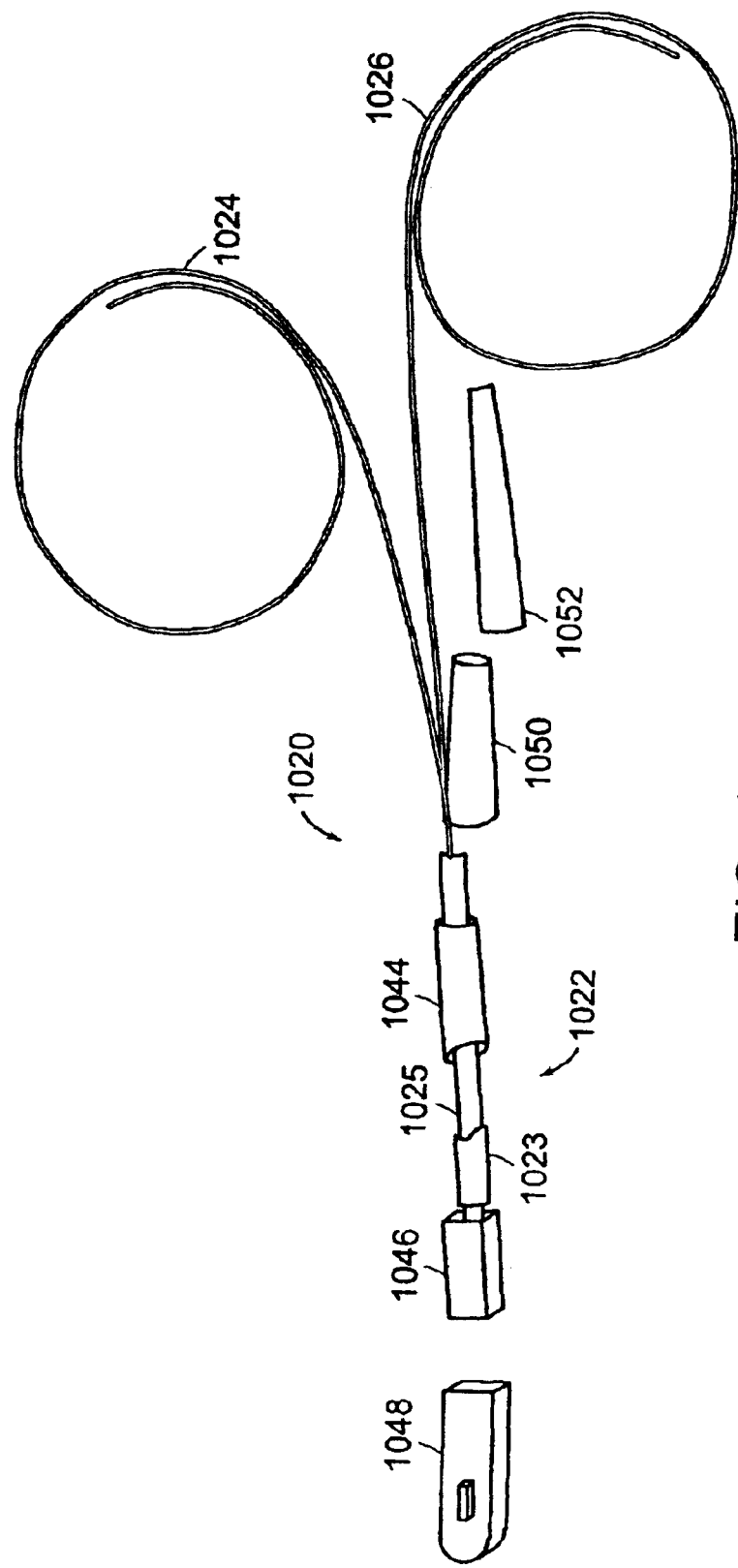
FIG. 48 is an exploded view of the integrated optical connector and coupler in accordance with a preferred embodiment of the present invention.

An exploded view of the connector and splitter portion 1022 of the integrated optical coupler and connector 1020 is shown in FIG. 48. The ends of the optical cables 1024 and 1026 are joined together in a coupler connector barrel 1044 of the connector and splitter portion 1022. The connector and splitter portion 1022 has a ferrule 1023 that encircles the end of the coupler connector barrel 1044. A connector outer body 1048 determines the end of the connector and splitter portion. An inner body 1046 is disposed within the outer body 1048. A spring or compression member 1025 is disposed over the sleeve 1045. An inner protective tubing 1050 and outer boot 1052 or shroud are used to protect the cables 1024 and 1026 with the inner protective tubing 1050 overlying the coupler and connector 1044.

Figure 49:
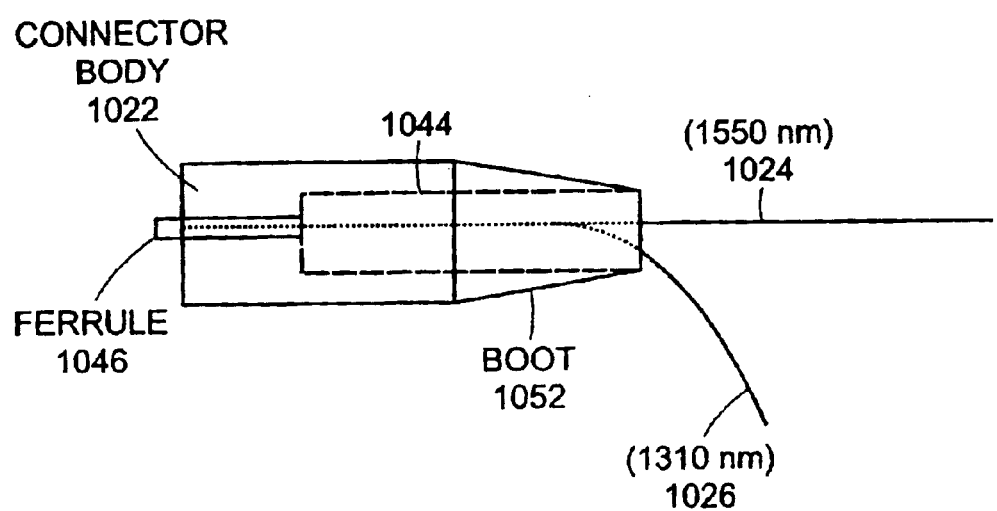
FIG. 49 is a schematic view of the connector and splitter portion of the integrated optical connector and coupler in accordance with a preferred embodiment of the present invention.

Referring to FIG. 49, a schematic of the connector and splitter portion 1022 of the integrated optical coupler and connector assembly 1020 is shown. The coupler connector 1044, referred to in FIG. 49 has the two optical cables 1024 and 1026 extending therefrom. At the other end of the coupler connector 1044 extends the ferrule 1046. The outer boot 1052 is shown overlying the coupler connector 1044 and the majority of the ferrule 1046. It is noted in the figure that optical cables 1024 and 1026 may be for different wavelengths in accordance to a preferred embodiment.

Figure 50:
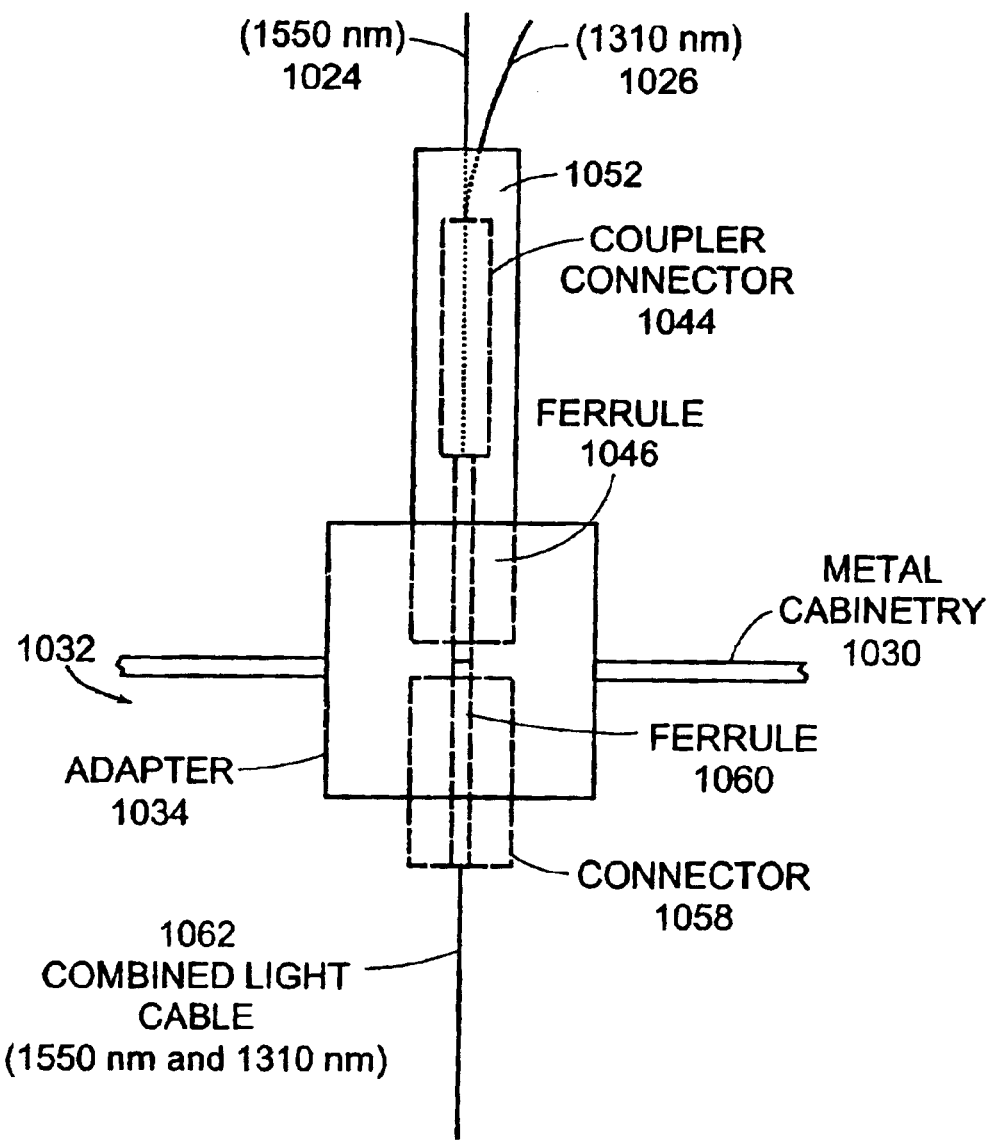
FIG. 50 is a schematic view of the connector and splitter portion of the integrated optical connector and coupler connected to a socket panel of an adapter in accordance with a preferred embodiment of the present invention.

FIG. 50 shows a schematic view of the connector and splitter portion 1022 of the integrated optical coupler and connector assembly 1044 engaging the connector 1058. The connector 1058 has a ferrule 1060 located in the adapter 1034 of the optical fiber cassette 1032 of the optical fiber housing 1030. Extending from the connector 1058 of the adapter 1034 is a combined light cable 1062 that contains optical data signals of at least two wavelengths received from the respective optical cables 1024 and 1026.

In a preferred embodiment, the integrated connector and coupler assembly is included in an optical transport network system for network monitoring. The optical transport network may include, voice, video and data systems using optical signals. The preferred embodiment includes an optical tap coupler integrated into a fiber optic connector as described hereinbefore. The preferred embodiment may be used in a network topology such as, but not limited to, a gigabit Ethernet system.

Figure 51A:
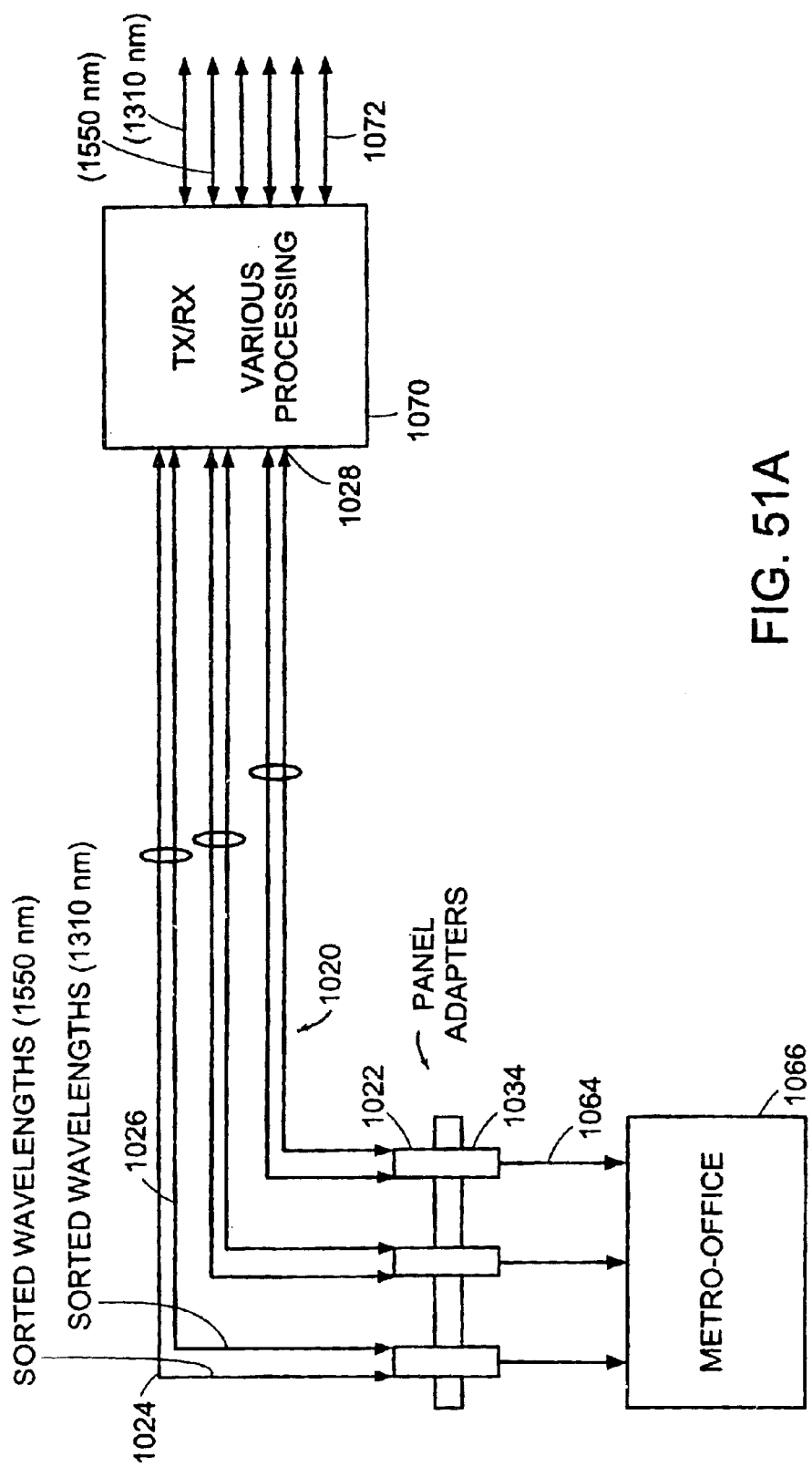
FIG. 51A is a schematic view of the integrated optical connector and coupler in a distribution system in accordance with a preferred embodiment of the present invention.

FIG. 51A is a schematic view of the integrated optical coupler and connector 1020 being used in a transmission/distribution system. The information data is being transmitted by an optical cable 1064 wherein various wavelengths are carried along the same cable 1064 from a location such as a metro office 1066. The cables 1064 are passed through an optical fiber housing 1030 having at least one optical fiber cassette 1032 with a plurality of adapters 1034. The optical fiber housing 1030 with a plurality of adapters receives a plurality of integrated optical coupler and connectors 1020 which takes the data transmitted along each of the single cables 1064 and splits it into a pair of optical cables 1024 and 1026 each receiving a particular wavelength.

In one embodiment, the sorted wavelengths are 1310 nanometers and 1550 nanometers. The 1550 nm wavelength optical cable 24 carries broadband data. The 1310 nm wavelength optical cable 1026 carries narrow band data in a particular embodiment.

The optical cables 1024 and 1026 of the integrated optical coupler and connector 1020 extend to a transmission receiving station 1070 where various processes can occur. The integrated optical coupler and connector 1020 have conventional optical connectors 1028 that interface with the transmission receiving station 1070. In the embodiment shown, the data/information is transmitted from the transmission receiving station 1070 along optical the cables 1072 which are tailored to the sorted wavelengths. In contrast to the integrated optical coupler and connector 1020, no splitting occurs along these optical cables 1072. One preferred embodiment of the distribution/transmission system of FIG. 51A is used for the transmission of data to and from a home computer.

Figure 51B:
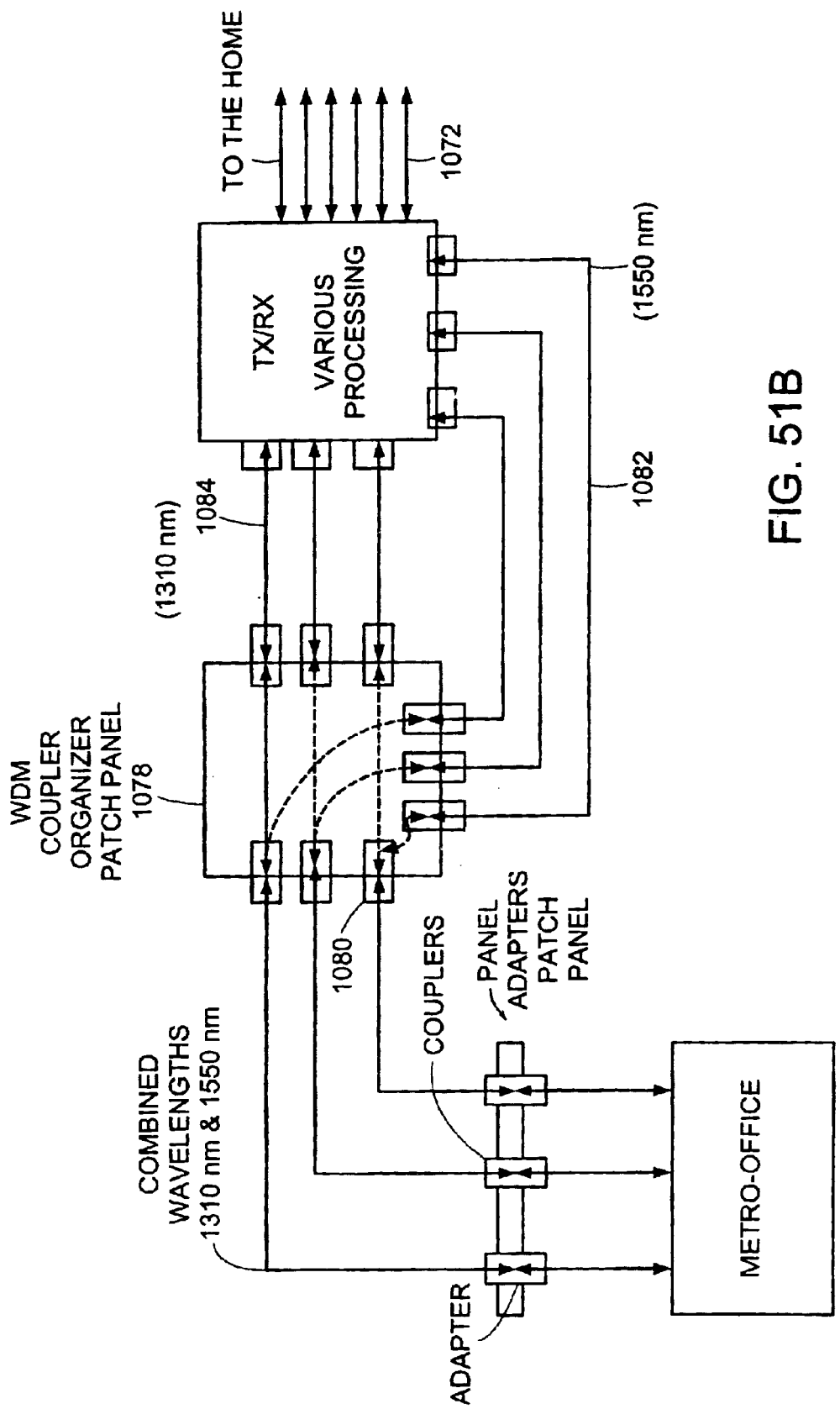
FIG. 51B is a schematic view of a prior art patch panel in the distribution system.

In contrast to the embodiment shown in FIG. 51A, FIG. 51B shows a prior art view of a transmission/distribution system. The combined wavelength data transmission is transmitted from the metro office 1066 through the cable 1064 to an interface to additional cables 1072 of combined wavelengths. A wave division multiplexing patch panel 1078 is interposed between the metro office 1066 and the transmission receiving station 1070. The wavelength division multiplexing patch panel 1078 has a coupler 1080 such as seen in detail in FIG. 52B for splitting or combining the combined wavelengths into cables carrying distinct wavelengths. Referring back to FIG. 51B, the wavelength division multiplexing patch panel 1078 has adapters for receiving optical cables 1082 and 1084 for carrying a specific wavelength data. Similar to the current embodiment, data from the transmitting receiving station 1070 is sent to a further location, such as a home, along the sorted wavelength optical cables 1072.

Figure 52A:
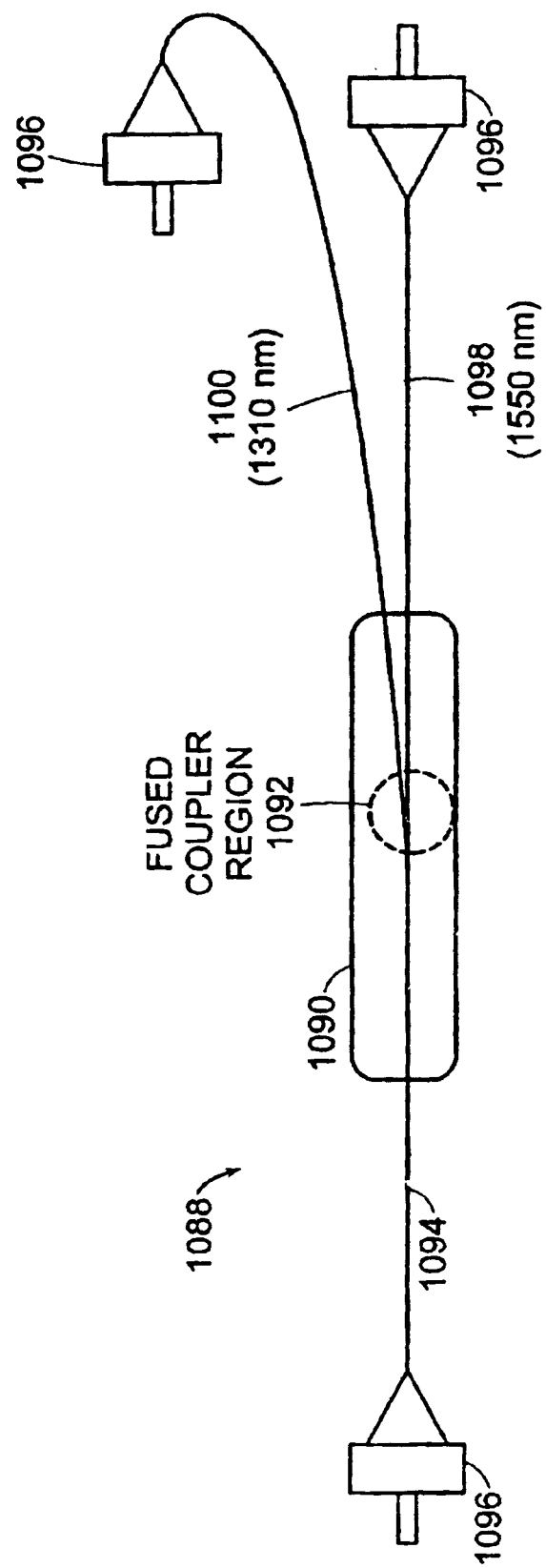
FIG. 52A is a schematic diagram of a prior art coupler.
Figure 52B:
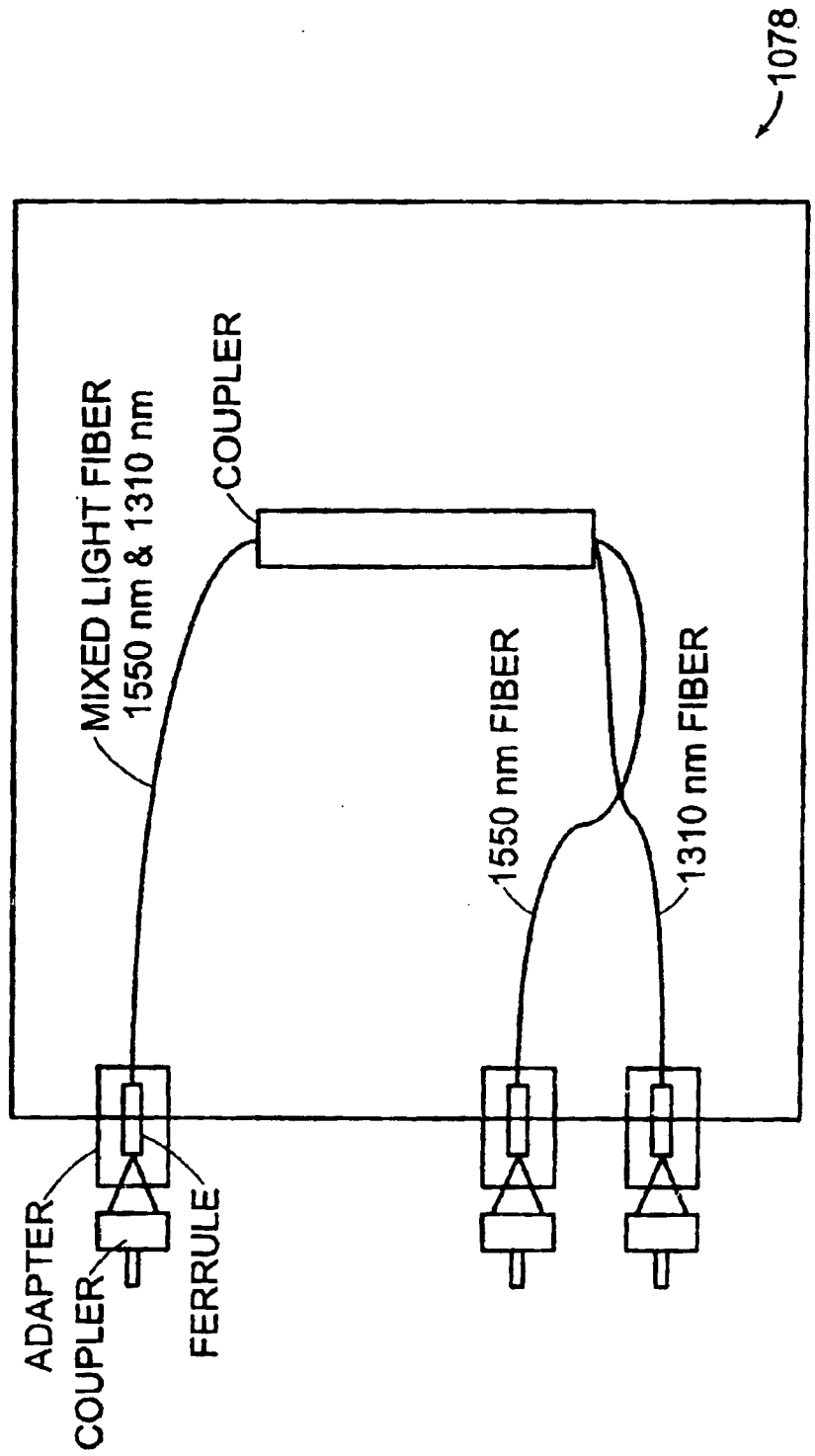
FIG. 52B is a schematic diagram of a prior art patch panel.

Another alternative to a wavelength division multiplexing patch panel 1078 is to have the coupler in the mid-span of a cable or jumper 1088 as shown in FIG. 52A. The optical cable jumper 1088 has a coupler unit 1090 with a fuse coupler region 1092. A mixed combined wavelength optical cable 1094 extends from the coupler connector 1090 to an optical connector 1096. Extending from the coupler connector 1090 in the other direction is a pair of sorted wavelength optical cables 1098 and 1100. These optical cables 1098 and 1100 similarly extend to optical connectors 1096.

Figure 53:
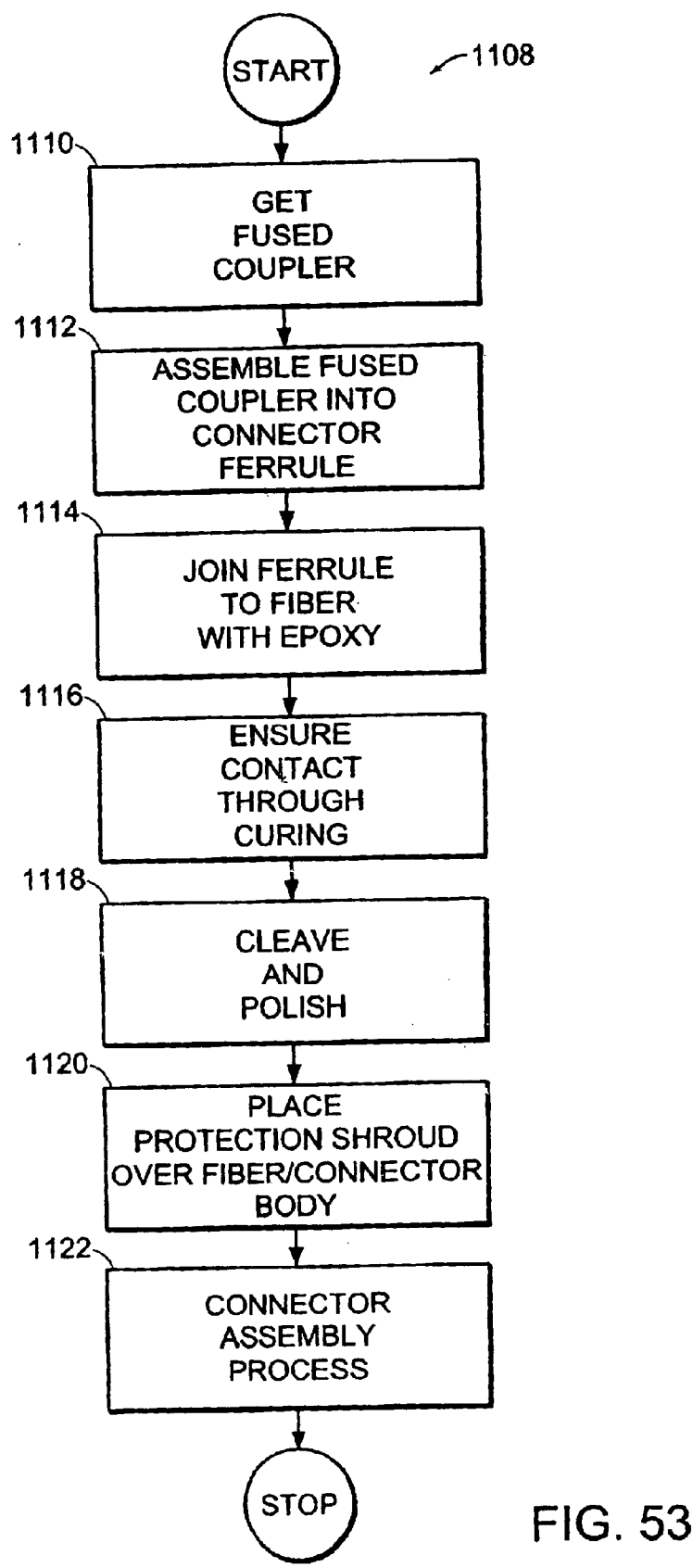
FIG. 53 is a flowchart of a connector assembly process in accordance with a preferred embodiment of the present invention.

FIG. 53 is a flowchart 1108 of an integrated optical coupler and connector 1020 assembly process 1108. The integrated optical coupler and connector 1020 according to the invention builds on existing connector and coupler technology and utilizes an innovative termination method. The method uses a standard raw fused fiber coupler as represented in step 1110 in FIG. 53. The insulation is stripped approximately 0.5 inch from the quartz substrate on the input leg of the coupler. The insulation is stripped through standard mechanical or chemical methods to a predetermined length. The input leg of the coupler is then terminated to a connector ferrule per step 1112.

The ferrule is joined to the fiber with a standard epoxy as represented in step 1114. Care is needed to ensure that the flange or the connector body is in contact with the coupler quartz substrate throughout the curing process until fully cured so that there is no gap between the connector ferrule body and the coupler substrate per step 1116. The connector body and coupler substrate are thus joined side by side. After the connector is cured, the connector is polished per a standard connector procedure without strain on the fiber per step 1118.

Upon completion of polishing, the remaining connector components are assembled around the ferrule and coupler. A protective shroud (boot) then is threaded over the fiber and connector body and then crimped to the back end of the connector body thereby providing stress protection for both the connector and the coupler per step 1120. Once crimped in place, the output fibers are encased in tubing with standard furication tubing. Adhesive-lined heat shrink is then used to cover the protective shroud and the furication tubing junction to provide strain relief for the entire assembly. The ends of the output fiber are then connected with standard connectors and methods per step 1122.

The design provides a high level performance that is essentially provided by the combination of the optical connector and coupler. This compact assembly provides an advantage over separate discrete units, for example, cassettes, which utilize additional connectors and incur additional performance penalties.

The compact optical splitter jumper can be used in any normal coupler applications such as Wavelength Division Multiplexing and optical power splitting. The jumper can be equipped with any standard connectors using a variety of cords and tube sizes commonly available.

Figure 54:
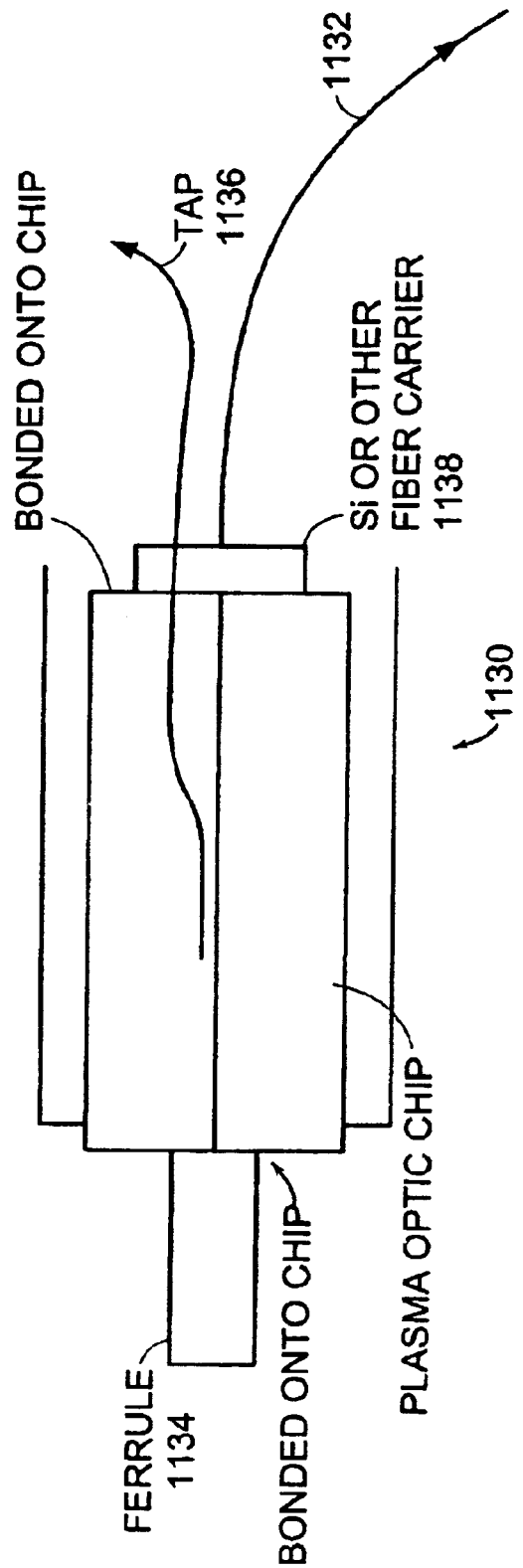
FIG. 54 is a schematic diagram of a tapped device in accordance with a preferred embodiment of the present invention.

FIG. 54 shows an alternative integrated optical coupler and connector 1130. In this embodiment, the fused fiber coupler is replaced with a planar optic chip. The connector 1130 has a through guide fiber 1132 that extends to the ferrule 1134. Thus the ferruled fiber 1132 is attached to the input. A tap fiber 1136 is fused to the through guide fiber 1132. The connector 1130 has a silicon or other fiber carrier 1138 bonded onto a planar optic chip 1140 that carries the fusing of the tap fiber 1136 to the through guide fiber 1132. A second tap can be added to the through line if required. This packaged embodiment may have an additional size advantage as the optic chip may in a preferred embodiment be in the order of 10 mm.

It is further recognized that there are alternative preferred embodiments of the present invention. In one such embodiment, a smaller diameter fiber may be used such as, for example, 80 micron instead of a 120 micron diameter fiber. The use of smaller diameter fiber results in a smaller coupler length. The application of the smaller coupler in the optical coupler jumper translates into an even more compact assembly since the overall coupler length may be as much as 30% less.

Another alternative preferred embodiment includes a unitarily fused coupler that has more than 2 output ports. In this approach, multiple fibers are fused and the input of the fiber bundle is positioned adjacent to the connector ferrule as in the standard coupler version. The assembly would result in more than 2 output ports following a similar mechanical assembly scheme. In a preferred embodiment, in order to keep the congestion due to the plurality of fibers low, fibers are bifurcated downstream of the coupling interface to the adapter. In preferred embodiments, color coding may be used with respect to the connectors for ease of identification. In particular, in a WDM application, a color shroud may be used to indicate WDM functionality. For particular network deployment applications attachment members such as, but not limited to, bracket clips may be used to fasten the optical elements.

In a preferred embodiment a similar approach may be used to replace the coupler quartz substrate with a glass waveguide. The input of the glass waveguide is positioned immediately adjacent to the connector ferrule. The glass waveguide contains one or more channels for splitting or coupling the optical signal into multiple outputs. The multiple output ports of the glass waveguide can then be connected to an optical jumper via silicon V-groove technology.

The claims should not be read as limited to the described order or elements unless stated to that effect. Therefore, all embodiments that come within the scope and spirit of the following claims and equivalents thereto are claimed as the invention.

What is claimed:

1. An optical fiber enclosure, comprising:
    a housing having a front compartment, a rear compartment and a bulkhead having a plurality of openings provided thereon, the housing further comprising a front access and a rear access and having at least one fiber radius guide associated with at least one of the front access and the rear access;
    a plurality of optical adapters mounted to the bulkhead with a subset of the plurality of adapters associated with at least one removable fiber cassette, the fiber cassette installable in one of the plurality of openings in the bulkhead;
    at least one optical coupler connector assembly coupled to at least one of the plurality of adapters;
    a front management plate moveably attached to the housing for organizing a first plurality of optical cables; and
    a rear management plate for organizing a second plurality of optical cables.

2. The optical fiber enclosure of claim 1 wherein the optical coupler connector assembly includes an optical coupler adjacent to a ferrule in the optical connector.

3. The optical fiber enclosure of claim 1 wherein the optical coupler connector assembly further comprises at least two output ports.

4. The optical fiber enclosure of claim 1 further comprising the optical coupler connector assembly located in each port in the enclosure.

5. The optical fiber enclosure of claim 1 wherein the bend radius of the optical coupler connector assembly does not exceed approximately 1.5 inches.

6. An optical monitoring device comprising:
    a removable fiber cassette having a plurality of adapters associated therewith;
    an optical connector associated with the fiber cassette and having at least one output port; and
    an optical coupler integral with the optical connector.

7. The optical monitoring device of claim 6 wherein the optical coupler is integrated adjacent to a ferrule in the optical connector.

8. The optical monitoring device of claim 6 further comprising a bend radius such that the device when coupled to an adapter in a patch panel requires no additional frame space.

9. The optical monitoring device of claim 8 wherein the bend radius does not exceed approximately 1.5 inches.

10. An optical network system comprising:
    a patch panel having a housing, the housing having a front compartment, a rear compartment and a bulkhead, the bulkhead having a plurality of adapters associated with at least one removable fiber cassette; and
    at least one optical coupler-connector assembly coupled to at least one of the plurality of adapters.

11. The optical network of claim 10 further comprising a gigabit Ethernet.

12. The optical network system of claim 10 wherein the optical coupler-connector assembly includes an optical coupler adjacent to a ferrule in the optical connector.

13. The optical network system of claim 11 wherein the optical coupler connector assembly further comprises at least two output ports.

14. An optical tap, comprising:
    an optical connector having at least one output port;
    an optical coupler integral with the optical connector;
    a first optical fiber communicatively coupled to the optical coupler; and
    a second optical fiber adjacent to and optically coupled with the first optical fiber, the optical coupling taking place without the use of refractive optical elements.

15. The optical tap of claim 14 wherein the optical coupler is integrated adjacent to a ferrule in the optical connector.

16. The optical tap of claim 14 further comprising:
    a patch panel having an adapter associated therewith, the patch panel further occupying a frame space; and
    a bend radius associated with the optical tap, the bend radius remaining within the frame space when the optical tap is coupled to the adapter.

17. The optical tap of claim 16 wherein the bend radius does not exceed approximately 1.5 inches.

18. The optical tap of claim 14 wherein the optical coupler comprises a quartz substrate.

19. The optical tap of claim 14 wherein the optical coupler comprises a glass waveguide.

20. The optical tap of claim 19 further comprising at least one channel for at least one of splitting and coupling an optical signal into a plurality of outputs.

21. A wavelength division multiplexing assembly, comprising:

an optical connector having at least one output port;

an optical coupler integral with the optical connector;

a first optical fiber; and a second optical fiber adjacent to and optically coupled with the first optical fiber, the optical coupling taking place without the use of refractive optical elements.

22. The wavelength division multiplexing assembly of claim 21 further comprising:

a ferrule mounted in the optical connector and adjacent to the optical coupler.

23. The wavelength division multiplexing assembly of claim 21 further comprising:

a patch panel having an adapter associated therewith, the patch panel further occupying a frame space; and a bend radius associated with the optical tap, the bend radius remaining within the frame space when the optical tap is coupled to the adapter, the bed radius further not exceeding approximately 1.5 inches.

24. An optical power splitter, comprising:

an optical connector having at least one output port;

an optical coupler integral with the optical connector;

a first optical fiber; and a second optical fiber adjacent to and optically coupled with the first optical fiber, the optical coupling taking place without the use of refractive optical elements.

25. The optical power splitter of claim 24 further comprising:

a ferrule mounted in the optical connector and adjacent to the optical coupler.

26. The optical power splitter of claim 24 further comprising:

a bend radius; and an adapter installed in a patch panel having a frame space associated therewith and coupled to the optical power splitter in a manner wherein the bend radius fits within the frame space.

27. A method of fabricating an optical tap device, comprising the steps of:

fusing an optical coupler into a connector ferrule;

joining the ferrule to a fiber to result in a fiber coupler-connector assembly;

curing the fiber coupler-connector assembly; and providing a protective shroud over the assembly.

28. An optical connector for coupling optical data signals, comprising:

a connector and splitter portion;

at least a pair of optical cables extending from the connector and splitter portion; and an optical connector at the distal end of each of the optical cables from the connector and splitter.

29. The optical connector of claim 28 wherein the connector and splitter portion includes a coupler connector for joining at least one optical cable to a primary optical cable.

30. The optical connector of claim 29 wherein the connector and splitter portion has a ferrule and outer connection for connecting to an adapter of an optical fiber cassette.

31. The optical connector of claim 28 wherein a first optical cable carries data at 1550 nm wavelength and a second optical cable carries data at 1310 nm wavelength.

\* \* \* \* \*